United States Patent
Kano et al.

(10) Patent No.: US 7,073,721 B2
(45) Date of Patent: Jul. 11, 2006

(54) CORRECTION OF CARD SHEETS IN AN ALIGNED POSITIONAL RELATIONSHIP

(75) Inventors: Kenichi Kano, Miyagi (JP); Kimitaka Nishimura, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/489,579

(22) PCT Filed: Sep. 13, 2002

(86) PCT No.: PCT/JP02/09454

§ 371 (c)(1), (2), (4) Date: Aug. 2, 2004

(87) PCT Pub. No.: WO03/024696

PCT Pub. Date: Mar. 27, 2003

(65) Prior Publication Data

US 2005/0006482 A1    Jan. 13, 2005

(30) Foreign Application Priority Data

Sep. 14, 2001 (JP) ............................. 2001-279739
Aug. 27, 2002 (JP) ............................. 2002-247578

(51) Int. Cl.
    *G06K 19/02* (2006.01)
(52) U.S. Cl. .................................... 235/488; 235/487
(58) Field of Classification Search ................ 235/492, 235/487, 488
    See application file for complete search history.

(56) References Cited

U.S. PATENT DOCUMENTS

| 4,460,825 A |   | 7/1984  | Haghiri-Tehrani |
| 4,463,971 A | * | 8/1984  | Hoppe et al. .................. 283/83 |
| 5,900,307 A | * | 5/1999  | Barcikowski ............... 428/203 |
| 6,007,754 A | * | 12/1999 | Crawford et al. ........... 264/219 |
| 2001/0005603 A1 | | 6/2001 | Kubota |

FOREIGN PATENT DOCUMENTS

| JP | 59-206200   | 11/1984 |
| JP | 63-13395    | 1/1988  |
| JP | 2000-33791  | 2/2000  |
| JP | 2000-182014 | 6/2000  |
| WO | WO 02/081186 | 10/2002 |

* cited by examiner

*Primary Examiner*—Michael G. Lee
*Assistant Examiner*—Jamara A. Franklin
(74) *Attorney, Agent, or Firm*—Sonnenschein Nath & Rosenthal LLP

(57) ABSTRACT

Collation and welding of card component sheets can be performed in a simple facility. Plastic cards such as IC cards having substantially no distortion and twisting are provided. A round hole (17) and an ellipse hole (18) are formed at the corresponding positions in layered component sheets (19a to 19d), and positioning pins (21) are inserted and passed through respective holes. Since at this occasion, the ellipse hole (18) has play relative to the positioning pin (21), the distortion and twisting of each card component sheet can be adsorbed, and the appearance can be improved by avoiding printing dislocation and the like. It is also able to prevent mechanical strength from lowering due to residual stress.

7 Claims, 35 Drawing Sheets

Fig.2
(a) LAMINATE SHEET PREPROCESSING PROCESS
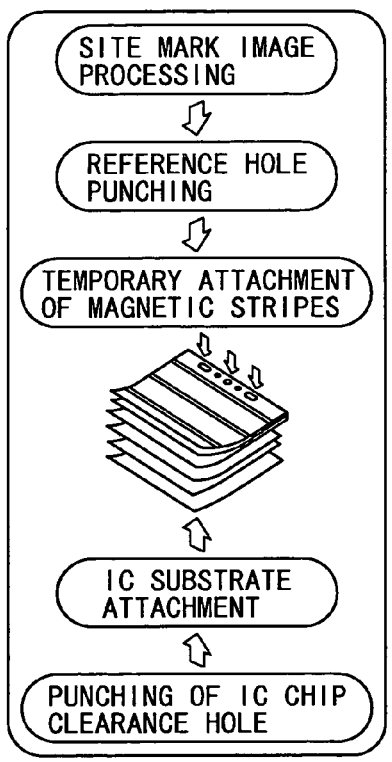
(b) PRIMARY COLLATION PROCESS
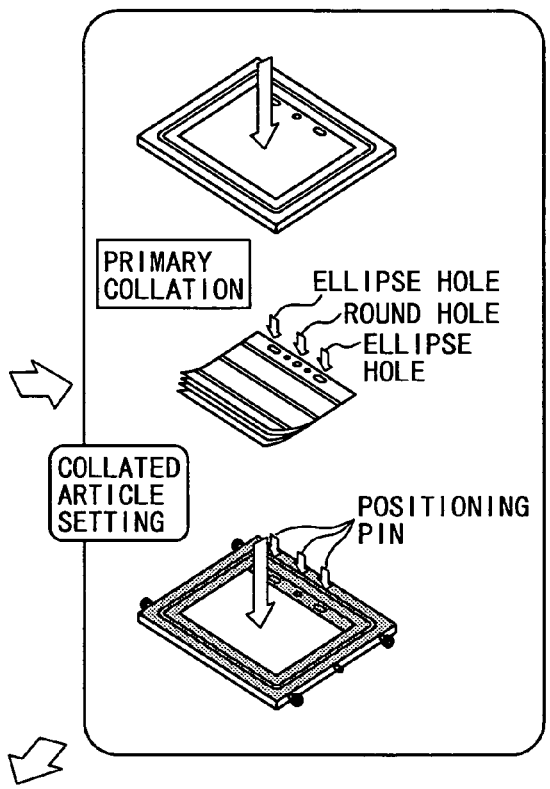
(c) PRIMARY LAMINATE PROCESS
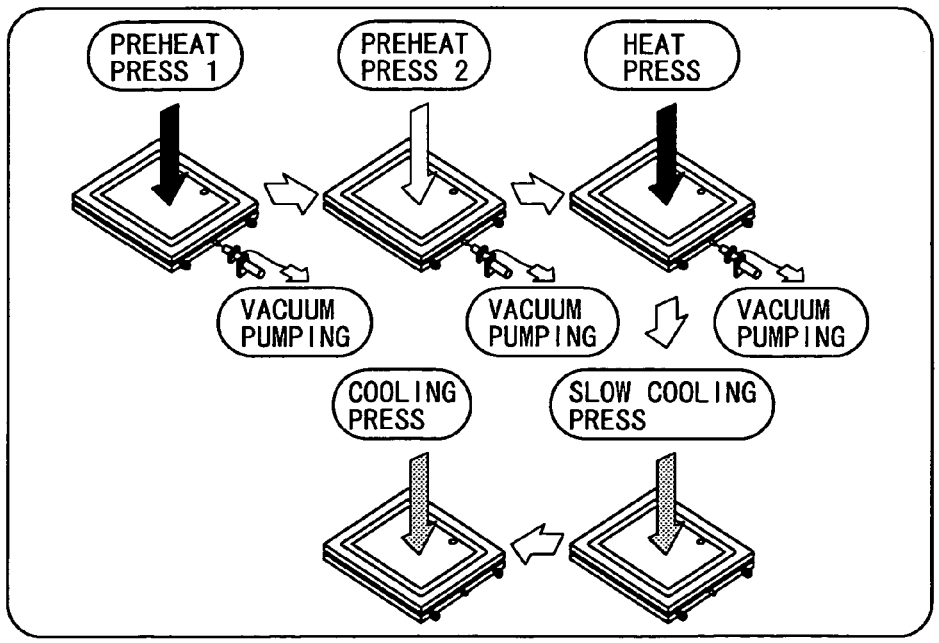

Fig.3
(d) PLATE OPENING PROCESS
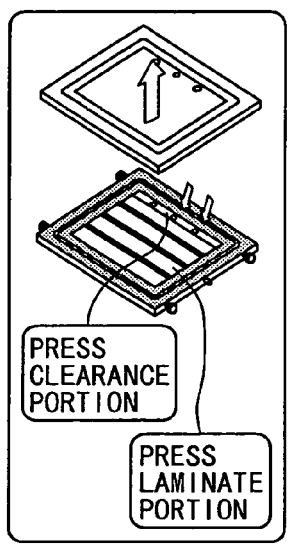
(e) SECONDARY COLLATION PROCESS
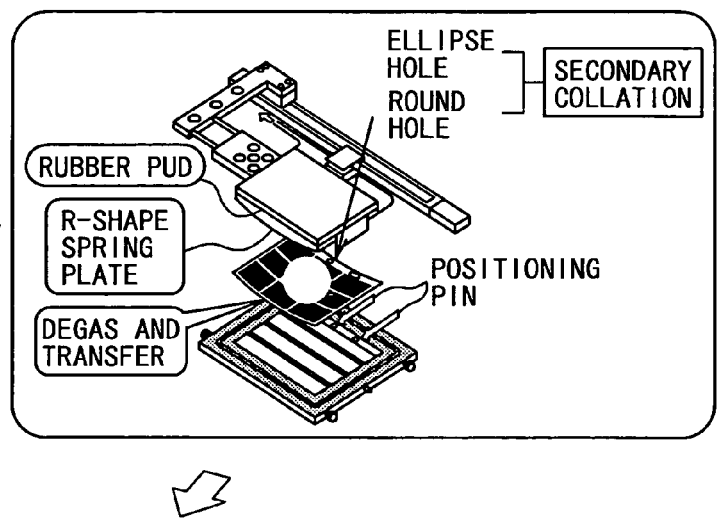
(f) SECONDARY LAMINATE PROCESS
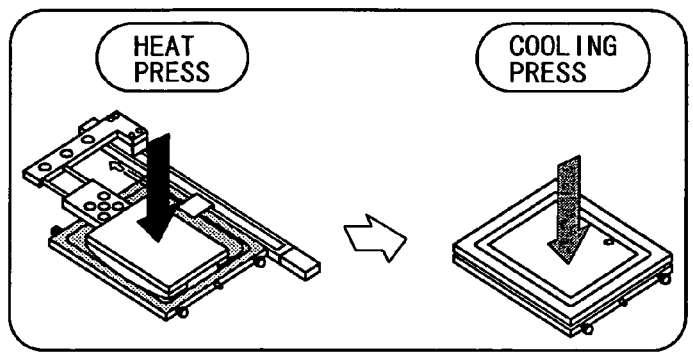
(g) CARD CONTOUR PUNCHING PROCESS
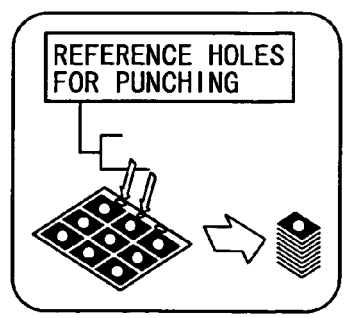

CORRECTION OF CARD SHEETS IN AN ALIGNED POSITIONAL RELATIONSHIP

PRIORITY CLAIM

The present application claims priority from International Application No. PCT/JP02/09454, filed Sep. 13, 2002, which claims priority from Japanese Application No. 2001-279739, filed on Sep. 14, 2001, and Japanese Application No. 2002-247578, filed on Aug. 27, 2002, all of which are hereby incorporated by reference.

BACKGROUND OF THE INVENTION

The present invention relates to a plastic card in which a plurality of card component sheets forming a plastic card such as an IC card is layered without causing dislocation in collation, also to a plastic card manufacturing method, a plate for heat press and a card manufacturing apparatus.

Recently, in card-like storage media such as credit cards, ID cards and cash cards, there has been development in, in addition to magnetic cards, IC cards mounting an IC module that contains in the card material semiconductor memory such as microprocessors, RAM (random access memory), ROM (read only memory) and the like. As this type of IC card, there are for example contact type IC cards, non-contact type IC cards, and IC cards having both functions of contact and non-contact type IC cards. Any of these IC cards is superior to other card-like storage medium in the point of having extremely large amount of information storage and having security property.

Most of these cards are formed by plastic (resin). Card information such as a personal name, and registration number and the like are stored in manufactured cards, and the card information are read out by various readers.

Various plastic cards including IC cards are manufactured by layering a plurality of card component sheets, followed by heat welding. Conventionally, the collation of card component sheets are performed mostly by hand, one by one in the order of the layering, and then point welding is performed by heat welding or ultrasonic welding. To automate layered collation and the welding of collate sheets, it is necessary to transfer a large rigidity-free resin sheet of 50 to 250 µm, perform positioning for image processing, and collate and weld one by one. Therefore there is the drawback of requiring a large-sized expensive collation facility.

In the conventional plastic cards other than IC cards, all layer sheets such as magnetic stripes, an outermost layer sheet and design pattern are collated, and a layered card is formed in a single press step. In the case of IC cards, however, a convex-like antenna copper pattern and a convex-like IC chip are contained in the vicinity of the center of card component sheets. In manufacturing this IC card, if individual card component sheets are layered and heat-pressed, as has been conventional, the layer sheets follow the shape of the convex-like IC chip of an inner layer during the heat press. As a result, the print pattern in the vicinity of the IC chip is remarkably disturbed and deformed, thereby causing the fatal drawback in appearance quality.

For example, as one type of IC cards, there is a rewrite IC card having in the surface thereof a leuco printing layer for writing information. In this card, the distortion of the card surface in the vicinity of the IC chip may cause the fatal drawbacks on the leuco printing layer, such as character blur and missing of print character in write information, because a uniform gap with a thermal head for writing information is not assured.

Referring to FIG. 38, the layered structure of a conventional IC card will be described.

As shown in FIG. 38, the conventional IC card is constructed around an antenna substrate 1 serving as the core of the layered structure.

An anisotropic conductive film 2 having adhesive property is attached to a position where an IC chip is layered the upper surface of the antenna substrate 1. Subsequently, a non-contact type IC chip 3 is stuck to the upper surface of the anisotropic conductive film 2, for example, at a surface pressure of 800 g, while heating at 180 to 250° C. At this time, one of three bumps of the non-contact type IC chip 3 makes contact with the anisotropic conductive film 2 and forms a circuit on the surface of an antenna pattern. Other bumps penetrate the anisotropy conductive film 2 and form a circuit with an antenna pattern provided on the rear surface of the antenna substrate 1. Then, in order to assure the continuity property of the IC chip 3 that is an important part, the upper surface of the IC chip 3 is sealed with, for example, an adhesive material 4a to which an epoxy adhesive containing 10% filler is applied. Further, in order to protect the sealed IC chip 3, reinforcing protection is performed by disposing a reinforcing plate 5a made of stainless steel or the like on the upper surface of the adhesive 4a. An adhesive 4b and a reinforcing plate 5b made of stainless steel or the like are layered on the rear surface of the antenna substrate 1, thereby completing the layering of the antenna substrate 1.

Adhesive sheets 6a and 6b are respectively layered on the upper and lower surfaces of the antenna substrate 1 after the completion of the layering, and an upper armoring material 7a and the lower armoring material 7b are stuck to the adhesive sheets 6a and 6b, respectively. A recess portion 6c that serves as clearance for an IC chip is formed in the adhesive sheets 6a and 6b.

Magnetic stripe shielding layers 7c and 7d are layered via a magnetic stripe 7e on the upper surface and the lower surface of the upper armoring material 7a and lower armoring material 7b, respectively. Further, printing ink layers 8a and 8b are layered on the upper surface of the upper magnetic stripe shielding layer 7c and on the lower surface of the lower magnetic stripe shielding layer 7d, respectively (in the case of the rewrite card, the outermost layer is the leuco printing layer, and the magnetic stripe shielding layer is removed).

To the above-mentioned layered structure, respective card component sheets are stuck under thermal press of, for example, 100 to 200° C. and approximately one ton per card, thereby forming the card. Since in the layering by heat press the layer materials stretch somewhat due to the thermal press, the card is formed by contour punching using an IC chip as a reference.

Although FIG. 38 gives explanation in terms of single leaf size (one card), a heat-press-layer-bonding is performed for a large size (approximately A3 size) of multi-leaves size (18 cards) in layer bonding of layers in a general heat-press.

In the manufacture of the IC card so constructed, a large-sized vacuum multistage press has conventionally been used. In vacuum multistage press system, card component sheets in which an antenna substrate mounting an IC chip and an armoring material are collated in the order of layer bonding are charged to a press platen disposed within a large vacuum chamber. After the inside of the vacuum chamber is subjected to vacuum pumping up to a predetermined pressure, layered a plurality of IC cards are manufactured at a time through respective processing of preheat press processing, heat-press processing and cooling press processing.

The vacuum multistage press system requires much time for one cycle from degassing in the inside of the vacuum chamber to raising temperature and cooling of the press platen. Therefore, 6 sets to 12 sets of card component sheets, in which multi-leaves size (approximately A3 size) corresponding to 18 cards is collated and layered, are charged in the inside of the vacuum chamber at a time, thereby increasing the amount of charge to maintain productivity.

However, in the above-mentioned vacuum multistage press system, having the press platen in the vacuum chamber serve heating function and cooling function, respective steps of preheating, heating and cooling are performed continuously. However, manufacture cycle time up to the completion of layer bonding of card component sheets is long, and therefore there are difficulties in maintaining productivity and mass production capability. Further, there is also a problem that along with rapid heating and rapid cooling of the press platen, energy consumption becomes tremendous, thus being poor in economics.

To eliminate the above problem, Japanese Patent Unexamined publication No. 2000-182014 describes a plate for heat press 80 wherein a pair of upper and lower plate members 81a and 81b press a plurality of collated and layered card component sheets C, and a degassing hose 84 connecting to a degassing unit 83 is connected to a circular hollow ring member 82 disposed in the outer peripheral portion of a pressing surface thereof, as shown in FIG. 39.

The plate for heat press 80 has a structure such that an upper plate member 81a is overlaid via a sealing member 85 on a lower plate member 81b fixed to respective edge portions of a cruciform arm member 90. As shown in FIG. 40, there is constructed such that by partial rotation drive, 900 each, of the arm member 90, respective plates for heat press 80 are positioned sequentially at a preheat press portion 86, a heat press portion 87, a cooling press portion 88, and a standby portion 89 where there is performed supply and discharge of card component sheets by a transfer mechanism 91.

With this construction, only degassing processing between the upper and lower plate members 81a and 81b having a low spatial volume is required, and therefore a desired degree of vacuum is obtainable in a short time. Additionally, it is arranged such that the plate for heat press 80 is transferred sequentially to the respective press portions 86 to 88, which are maintained at their respective predetermined temperatures. Therefore, as compared to the conventional vacuum multistage press system, card manufacturing cycle time is reduced, so that productivity and mass production capability can be improved, and at the same time energy-saving capability is also improved.

In the meantime, in the layer bonding of various sheets of the IC card having the construction shown in FIG. 38, a lateral force is exerted during layering or heat press, and therefore a lateral dislocation occurs between adjacent sheets in a plurality of card component sheets, failing to perform accurate collation in some cases. Conventionally, in order to eliminate this drawback, two or more reference holes passing through all card component sheets are formed in margin portions in the card component sheets, which do not finally construct an IC card and the like, and heat press is performed while securing the positional relationship between the respective card component sheets by positioning pins passing through and blocking at least two of the aforesaid reference holes, thereby preventing the above-mentioned character blur and print drift (for example, Japanese Patent Unexamined Publication No. 2000-33791).

However, mutual fixing of the plurality of card component sheets with use of these positioning pins suffers from a problem that, if two positions of disposing the positioning pins are improper, the card component sheets cause distortion and twisting, and if heat press is performed in this state, print drift or the like occurs so that not only the appearance deteriorates but also the mechanical strength of the card degrades due to residual stress.

On the other hand, in the construction of the plate for heat press 80 described in Japanese Patent Unexamined Publication No. 2000-182014, the collation of the card component sheets C to be layered on the plate member 81b exclusively depends upon the repeat accuracy of sheet supply position available from the transfer mechanism 91, and it is therefore difficult to obtain high collation accuracy. In general, as the sheet size increases, the collating operation between sheets becomes more difficult, and high collation accuracy is also required.

In addition, since in the conventional plate for heat press 80, the hollow circular ring member 82 is constructed as a degassing path, it is necessary to ensure the escape of residual air due to deformation by reducing the board thickness of the pressing surfaces of the plate members 81a and 81b to about 1 mm. Hence, when trying to from high vacuum, the deformation of the aforesaid pressing surfaces becomes significant, thus failing to perform accurate heat press operation. There is also a possibility that collation accuracy is disturbed due to the deformation of the pressing surface.

Further, there is a problem that in order to maintain the vacuum pressure of the inside of the plate for heat press 80, it is necessary to have the degassing hose 84 follow along with the transfer of the aforesaid plate 80, and therefore one is forced to accept limitations as to the degree of freedom of apparatus design.

Additionally, when noted in the viewpoint of a card manufacturing apparatus, the respective press sections 86 to 88 for preheating, heating and cooling are respectively arranged individually in a cluster. Accordingly, to additions of the press sections such as to form the preheating press section in multi-stage, it fails to take a rapid measure, thereby making it very difficult to accurately manufacture a vast variety of plastic cards in accordance with the combination of card substrate component materials.

Additionally, since the transfer path of the plate for heat press 80 is planar, it is impossible that a plurality of paired heating/cooling press portions are disposed so as to manufacture many types of plastic cards in a single apparatus. That is, this results in a construction far apart from a card manufacturing apparatus covering a vast variety of types required in the present manufacturing field, which is small size and inexpensive and has introduction effect.

The present invention is made taking the above-mentioned problems into consideration, and an object thereof is to provide a plastic card and a plastic card manufacturing method which can prevent the occurrence of distortion and twisting when manufacturing a plastic card by welding card component sheets by heat press, while securing their mutual positional relationship with use of a plurality of positioning pins.

Further, another object of the present invention is to provide a plate for heat press which can maintain vacuum of the inside a plastic card to be manufactured in such a way that the plastic card is separated from a degassing unit while preventing the distortion and twisting of the plastic card to be manufactured.

Further, another object of the present invention is to provide a card manufacturing apparatus which can properly manufacture various plastic cards by flexibly responding to changes in the layout of a press section and to additions of the press section, and which can manufacture many types of plastic cards in a single apparatus.

SUMMARY OF THE INVENTION

In order to achieve the foregoing objects, a plastic card of the present invention is characterized by forming two or more reference holes in a plurality of corresponding positions in each sheet of a plurality of card component sheets, having a first positioning pin of substantially the same shape as said reference holes pass through at least one of said reference holes, having a second positioning pin of a smaller sectional area than the shape of said reference holes pass through at least one of the remaining reference holes, and performing welding while securing the positional relationship between said plurality of card component sheets.

The reference hole having substantially the same shape as the sectional shape of the first positioning pin (hereinafter referred to as a "first reference hole") has the function of fixing (centering) and integrating a plurality of card component sheets. The reference hole having a greater hole area than the second positioning pin (hereinafter referred to as a "second reference hole") has the function of adsorbing a lateral dislocation and extension of the sheets. Thereby, the respective card component sheets are integrated at high collation accuracy, without causing distortion and twisting of the sheets.

Thus, according to the present invention, plastic cards such as IC cards and the like can be manufactured by layering the card component sheets without substantially causing distortion and twisting of the card components sheets by an extremely simple method of adjusting the size of the second reference hole.

In particular, if the formation of reference holes is done by image processing, all of the card component sheets including print pattern sheets which are the lowermost layer and the uppermost layer can be layered accurately by the positioning pins, thereby facilitating to collate the print pattern sheets which are respectively the lowermost layer and the uppermost layer disposed most remotely.

In the case of an IC card mounting an IC chip, card component sheets follow a shape of the IC chip and, in some cases, such shape-follow reaches the surface of the card, thereby significantly distorting the print pattern on the surface. To solve this, a primary heat press of collating and welding inner layers except for the outermost layer sheet, and a secondary heat press of collating the above-mentioned outermost layer to the welded inner layers and then welding may be performed separately.

In a rewrite card in which information is written into a leuco layer on the surface of the card, the distortion and shrinkage of a leuco printing layer sheet are avoidable, and the contact with a thermal head for writing information is improved, so that character blue and character missing in the writing are avoidable thereby to achieve quality improvement.

In order to prevent card component sheets from being layered upside down, it is desirable to dispose the above-mentioned reference holes asymmetrically on the surface of the respective card component sheets. The term "asymmetry" in this case includes the forming position of the reference holes and the shape of the reference holes. Even if the forming positions of the reference holes are symmetry, it is easy to distinguish the top and the back if the reference holes have different shapes.

As a material of card component sheets of the present invention, polycarbonate, ABS (acrylonitrile-butadien-styrene resin), and polyesters such as PET(polyethylene terephthalate), PETG (polyethylene terephthalate copolymer), PBT (polybutylene terephthalate) are representatives. Besides these, polystyrene, polyamide, polymethyl methacrylate, acrylonitrile-styrene copolymer, cellulose propionate, cellulose acetate butylate and the like are usable. In addition, materials obtained by subjecting these to polymer-alloying are also suite for use as a card. More specifically, polycarbonate/PETG, polycarbonate/PBT, polycarbonate/ABS and the like are suitable.

Further, a plate for heat press of the present invention is characterized by having a pair of upper and lower plate members, a circular sealing member which is disposed between a pair of plate members and defines a storing section for housing card component sheets, an exhaust passage, one end of which faces a storing section and the other faces the outside of plate members, a check valve apparatus connected to the other end of an exhaust passage so as to prohibit outside air from entering a storing section, and positioning pins being disposed vertically within a storing section and passing through two or more reference holes formed at respective corresponding positions in a plurality of card component sheets, respectively, wherein the positioning pins have a first positioning pin having approximately the same shape as at least one reference hole of a plurality of reference holes, and a second positioning pin having a smaller sectional area than at least one reference hole in the remaining reference holes.

With this construction, the respective card component sheets can be integrated without substantially causing distortion and twisting of the card component sheets. Additionally, since the degree of vacuum of the storing section can be maintained by the function of the check valve apparatus, the plate for heat press can be transferred in a state of being separated from the degassing unit.

A card manufacturing apparatus of the present invention includes a plate for heat press of the above-mentioned construction, a transfer means for cyclically transferring a plate for heat press between two stages of upper and lower transfer passages, a supply section for layering a plurality of card component sheets between a pair of plate members, a secondary section comprising a plurality of press sections arranged in series along a transfer path and manufacturing a plastic sheet by subjecting a plate for heat press to press processing, and an extraction section for taking off the above-mentioned plastic sheet from a plate for heat press.

In accordance with a card manufacturing apparatus of the present invention, in addition to the operational effect of the above-mentioned plate for heat press, the degree of freedom to which the above-mentioned supply section, the secondary section and the extraction section can be arranged arbitrarily can be increased by forming in three dimensions the cyclic transfer path of a plate for heat press, thereby enabling to manufacture many types of cards in a single apparatus.

BRIEF DESCRIPTION OF DRAWINGS

FIG. 2, i.e., FIGS. 2(a) to FIG. 2(c), are perspective views showing early stages of a manufacturing process of an IC card using the card component sheet of FIG. 1A to FIG. 1C;

FIG. 3, i.e., FIGS. 3(d) to FIG. 3(g), are perspective views showing later stages of the manufacturing process of an IC card using the card component sheet of FIG. 1A to FIG. 1C;

FIG. 18A shows a state in which the upper plate member 111 is removed from the lower plate member 112, and FIG. 18B shows a state in which the upper plate member 111 is overlaid on the lower plate member 112;

FIG. 19A is a sectional perspective view of the sealing member, and FIG. 19B is a sectional perspective view of the sealing member in a state of being fitted to the lower plate member;

FIG. 37A shows a close-valve state, and FIG. 37B shows an open-valve state;

DETAILED DESCRIPTION OF THE PRESENTLY PREFERRED EMBODIMENTS

Figure 1A:
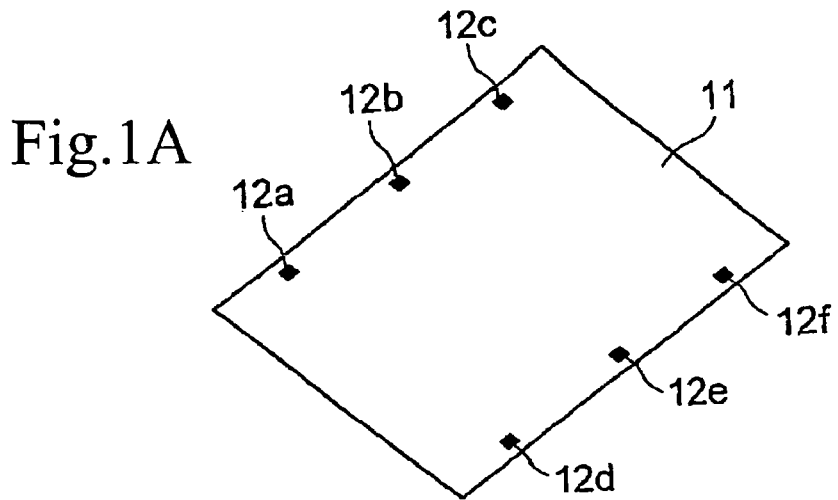
FIG. 1A is a perspective view showing one example of a card component sheet prior to processing.

Embodiments of the present invention will be described below by referring to the drawings.

First Embodiment

Figure 1B:
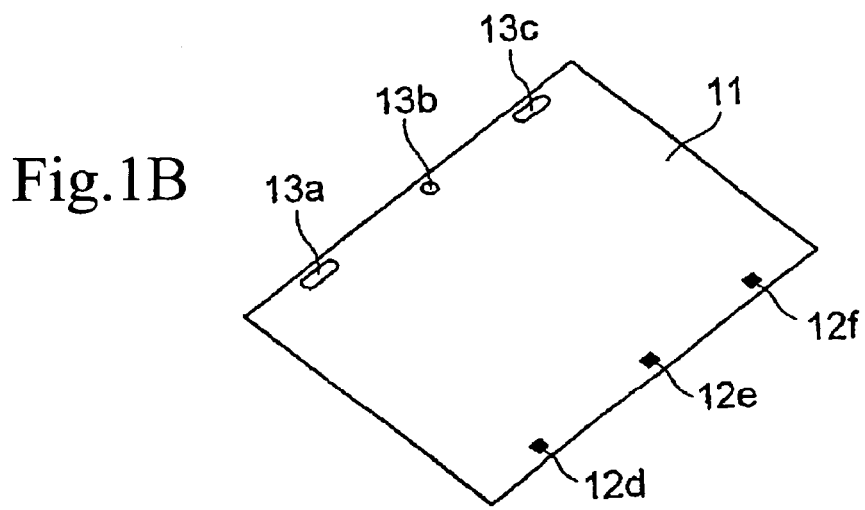
FIG. 1B is a perspective view showing a state in which round holes and ellipse holes are formed in the card component sheet.
Figure 1C:
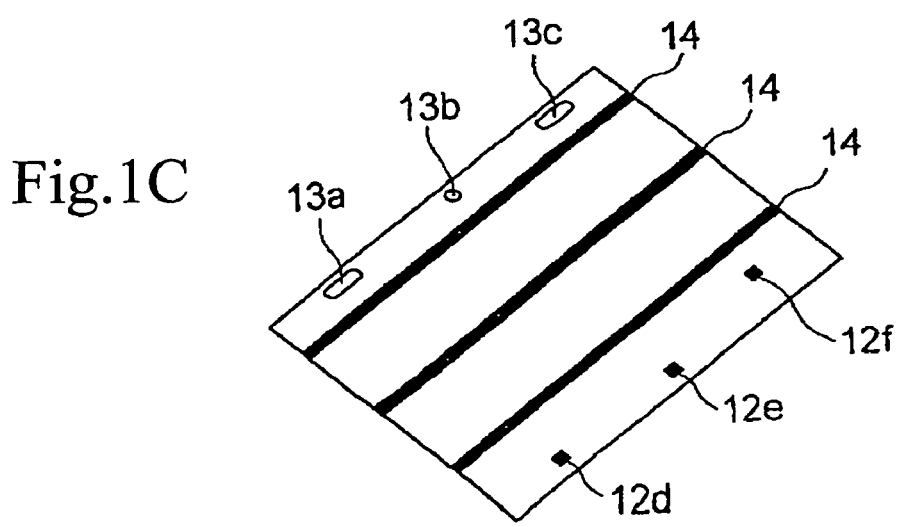
FIG. 1C is a perspective view showing a state in which magnetic strips are formed in the card component sheet.

FIG. 1A is a perspective view showing one example of card component sheets prior to processing which constitutes a plastic card according to the present invention. FIG. 1B is a perspective view showing the state in which one round hole (a first reference hole) and two ellipse holes (second reference holes) are formed in the card component sheet of FIG. 1A. FIG. 1C is a perspective view showing the state in which three magnetic stripes are formed in the card component sheet of FIG. 1B.

As shown in FIG. 1A, a card component sheet 11 has a rectangular shape in which there are printed three along two longer-sides, or a total of six site marks 12a to 12f. Although the method of forming a plurality of reference holes in the card component sheet 11 is not particularly limited, three site marks 12a to 12c on the longer-side of the card component sheet 11 are read, and a round hole 13b is formed at the position of the site mark 12b being at the center of the three site marks, and long holes (ellipse holes) 13a and 13c are formed at site marks 12a and 12c on both sides, respectively.

Note that the positions where these reference holes are formed are finally removed from the card. Although it is not required that embedding of the magnetic stripes 14 shown in FIG. 1C follows after the holes formation of FIG. 1B, if performed with use of the above-mentioned plurality of reference holes, that can be done more simply and accurately.

A manufacturing process of an IC card using the above-mentioned card component sheets will next be described based on FIG. 2(a) to FIG. 2(c) and FIG. 3(d) to FIG. 3(g).

First, as shown in FIG. 2(a), a plurality of card component sheets including an antenna substrate in which an IC chip (IC substrate) is embedded (see FIG. 38) are layered, and the image processing of site marks is performed, and then reference holes consisting of round holes and ellipse holes are punched (layer sheet preprocessing process). Then, as shown in FIG. 2(b), positioning pins are passed through the round holes and the ellipse holes of the plurality of card component sheets (a primary collation process). Thereby, the respective card component sheets can be layered without causing distortion and twisting with each other. Subsequently, as shown in FIG. 2(c), while performing vacuum pumping, respective steps of preheat press 1, preheat press 2, heat press, slow cooling press and cooling press are executed (a primary laminate process).

Then, as required, the plate is opened as shown in FIG. 3(d), a secondary collation using the reference holes is performed as shown in FIG. 3(e), further, a secondary laminate process consisting of heat press and cooling press is performed as shown in FIG. 3(f), and finally the obtained set of plastic cards containing a plurality of pieces is formed as a product, by punching for example three by three pieces of IC cards.

Since in the plastic cards so manufactured, the distortion and twisting among the plurality of card component sheets are adsorbed by the above-mentioned reference holes, particularly when containing an IC chip, distortion caused by the presence of the IC chip can be adsorbed, thereby providing plastic cards in which adjacent card component sheets stick to each other with no space and there is no deformation and residual stress.

Next, the respective processes will be described in more detail.

Figure 4A:
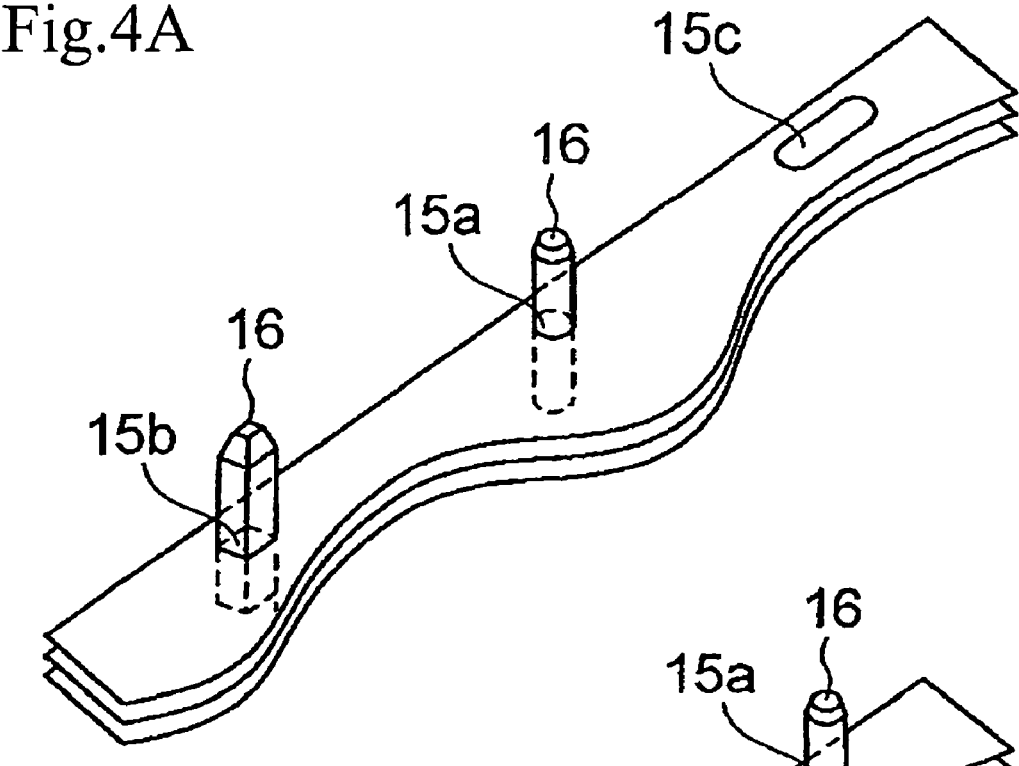
FIG. 4A and FIG. 4B are perspective views each showing a situation in which reference holes are formed.
Figure 4B:
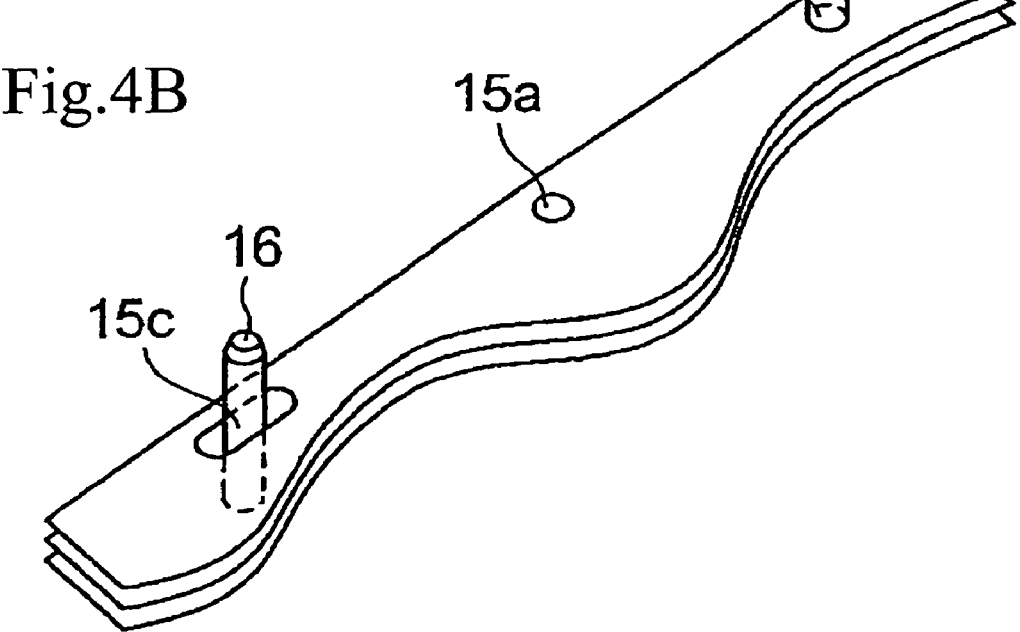

Besides symmetrically disposing reference holes to be formed taking the center of the three site marks along the longer-side as the round hole 13b, and the site marks on both sides as the ellipse holes 13a and 13c, respectively, as shown in FIG. 1A and FIG. 1B, reference holes may be disposed asymmetrically taking the center as a round hole 15a, the left as a square hole 15b, and the right as an ellipse hole 15c, as shown in FIG. 4A, or alternatively, taking the center and the right as the round holes 15a, and the left as the ellipse hole 15c, as shown in FIG. 4B. The positional relationship is secured by having positioning pins 16 pass through two or more of the reference holes.

Figure 5:
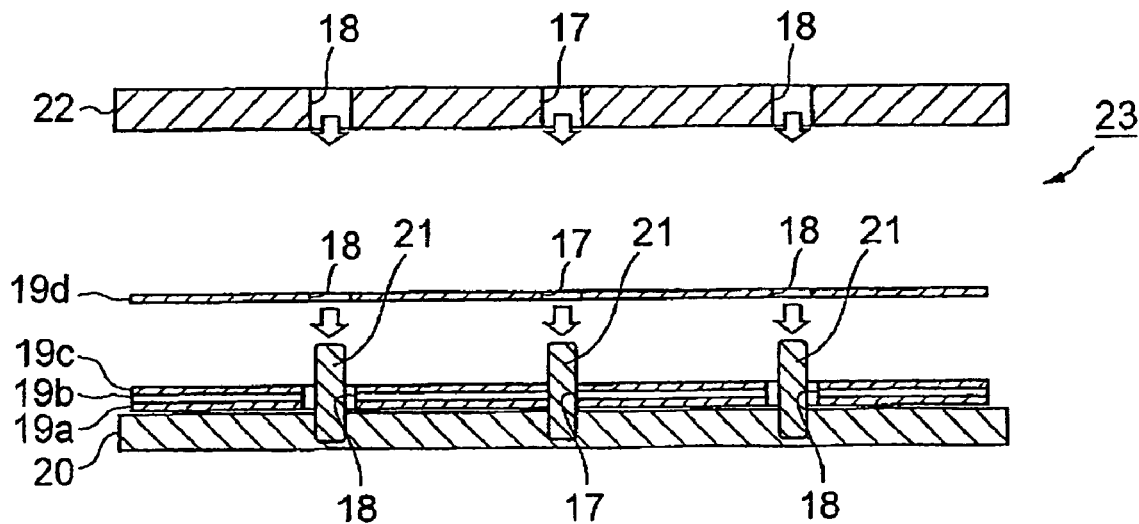
FIG. 5 is a sectional view showing a state in which a plurality of card component sheets are collated.

A procedure of collation of such plurality of card component sheets is shown in FIG. 5.

Site marks of card component sheets are subjected to image processing, or the card component sheets 19a, 19b, 19c and 19d, in which a round hole 17 at the center and ellipse holes 18 on both ends are formed by positioning layered sheets using contour butt, are collated and pressed so as to be sequentially layered on the lower plate member 20, followed by the collation with the positioning pins 21. Since at this time both of the ellipse holes 18 have play relative to the positioning pins 21, even if there is slight dislocation at the ellipse holes forming positions in the respective card component sheets 19a, 19b, 19c and 19d, the above-mentioned play absorbs this dislocation thereby to enable layering the respective card component sheets without causing distortion therein. Finally, the upper plate member 22 is layered on the uppermost card component sheet 19d, resulting in a layer sheet 23.

Here, the positioning pins 21 passing through the round holes 17 correspond to the "first positioning pin" of the present invention, and the positioning pins 21 passing through the ellipse holes 18 correspond to the "second positioning pins" of the present invention.

A process of making a plastic card by welding this layer sheet by heat press will next be described.

Plastic cards other than conventional IC cards employ a process of manufacturing plastic cards only by a primary heat press after collating card component sheets for layering including an outermost layer sheet of print pattern.

However, when trying to weld an IC card mounting an IC chip only by a primary heat press, there is a drawback such that a print pattern sheet, which is the outermost layer, is also deformed by following a shape of a convex portion of the IC chip located at the center of the layer, thereby significantly distorting the print pattern.

Figure 6:
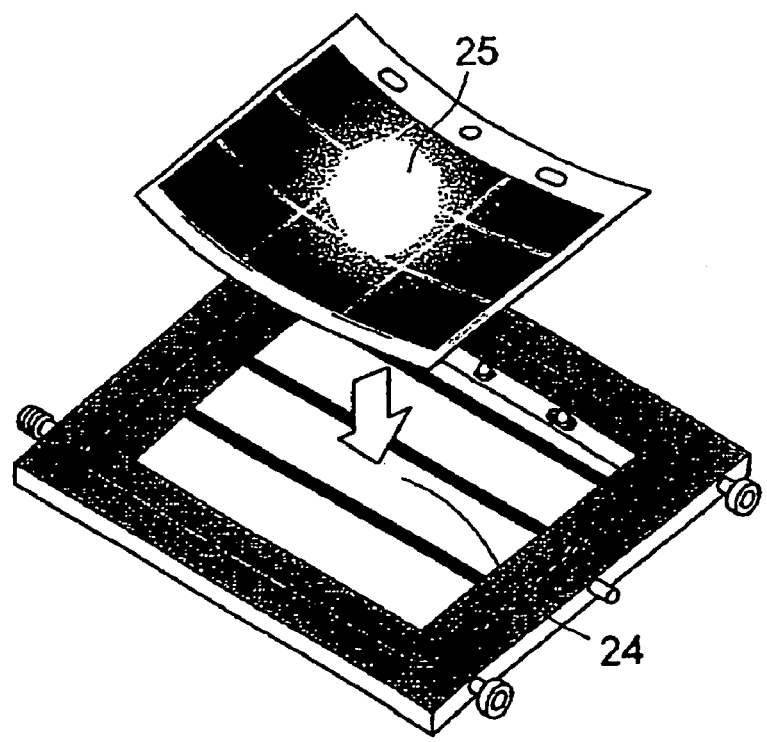
FIG. 6 is a perspective view exemplifying a situation in which collation of an outermost layer sheet and heat press are performed independently.

As a measure for this, for example, an inner layer sheet that is free from the influence of IC-chip-shape following is collated and heat-pressed, followed by heat press of a smooth blank card material following a shape of the IC chip (a primary heat press). A plastic card having no distortion of the print pattern can be provided by collating the print pattern sheet, which is the outermost layer, to a blank card so manufactured (indicated by the alphanumeric character "C1" in FIG. 38), followed by heat press (a secondary heat press) That is, as shown in FIG. 6, a plastic card having no distortion in the print pattern can be provided by making the primary collate-press layer sheets 24 as a smooth sheet (the blank card C1), and subjecting a print pattern sheet 25, which is the outermost layer, to a secondary collation onto the sheets 24, followed by heat press.

These heat press processes will next be described.

Figure 7:
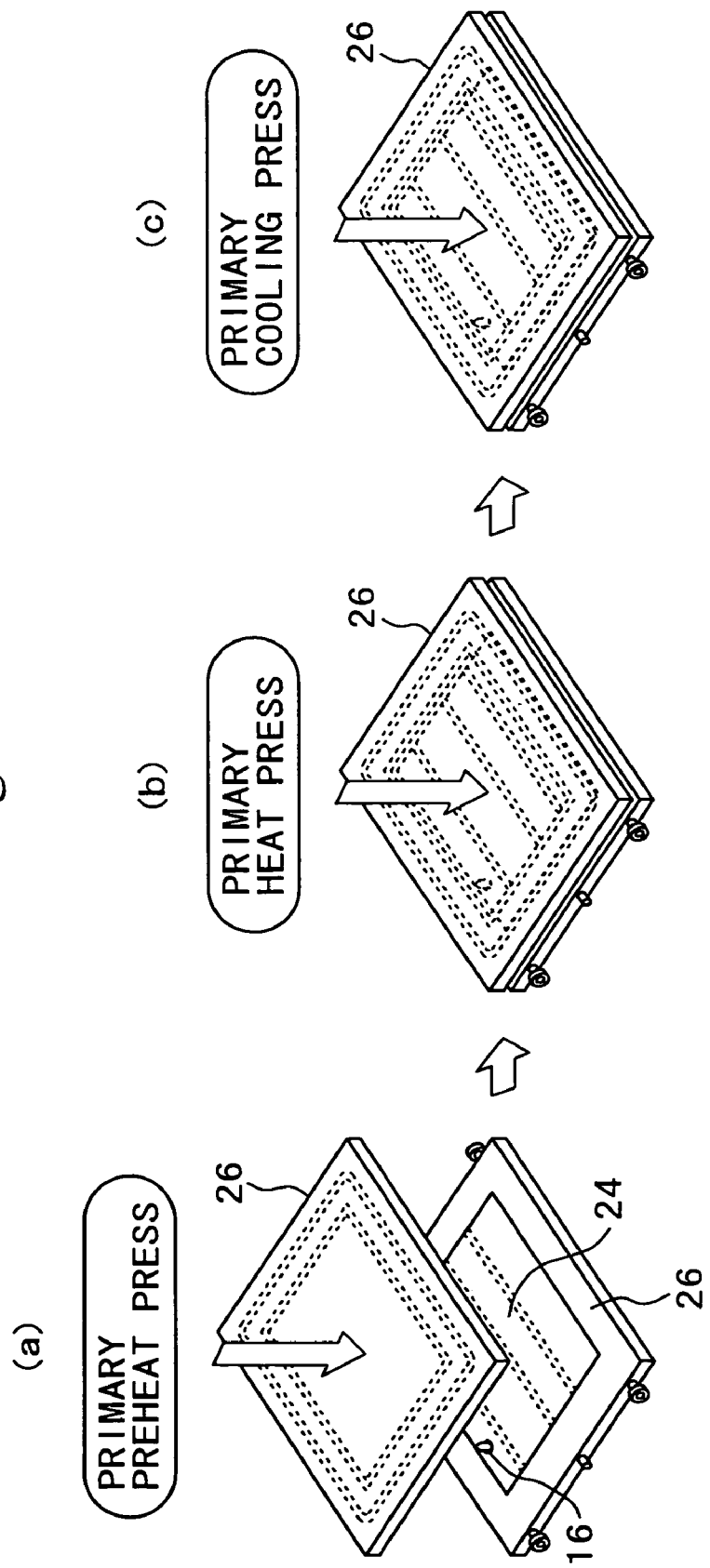
FIG. 7 is a perspective view showing a heat press process consisting of a primary preheating press (a), a primary heat press (b) and a primary cooling press (c)

As shown in FIG. 7(a), in a state in which primary collate-press layer sheets after being subjected to collation to the positioning pins 16 are interposed between a pair of upper and lower plate members 26, a primary preheat press is performed at, for example, approximately 120° C.×one ton. Further, as shown in FIG. 7(b), a primary heat press is performed at, for example, 120 to 180° C.×nine tons. In the collate-layer sheets at this moment, the layer sheets surfaces are heat-welded by heat press, thereby forming a layered structure. Then, as shown in FIG. 7(c), heat-pressed layer sheets are cooled slowly and then cooled at, for example, 5 to 15° C.×nine tons, thereby completing a primary heat press (a primary laminate) of the primary collation sheets.

Figure 8:
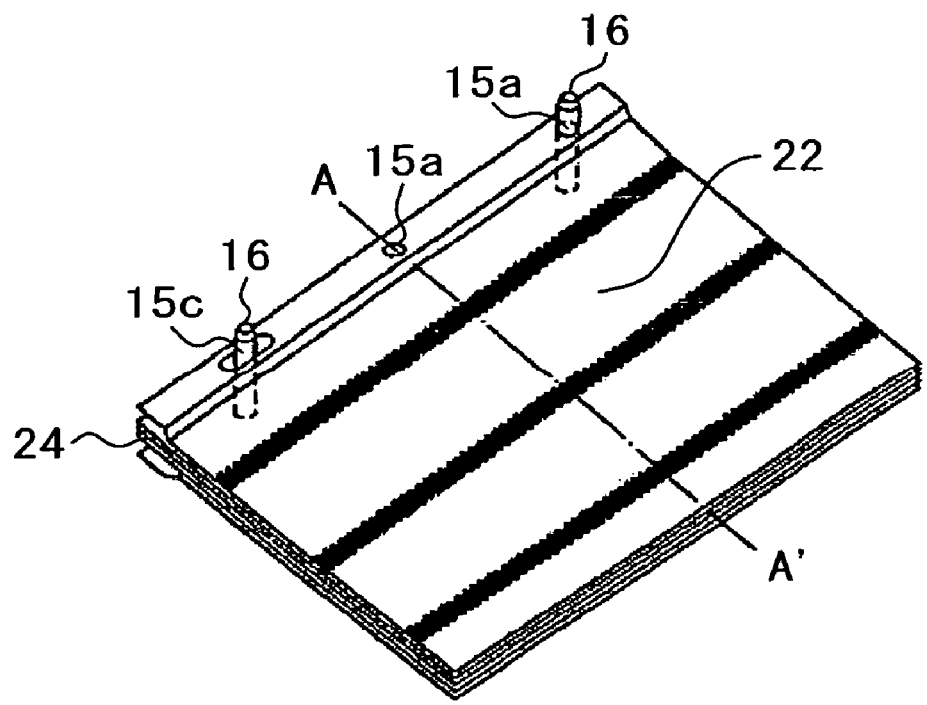
FIG. 8 is a perspective view showing a modification of a layered structure using a primary collate-press layer sheet.
Figure 9:
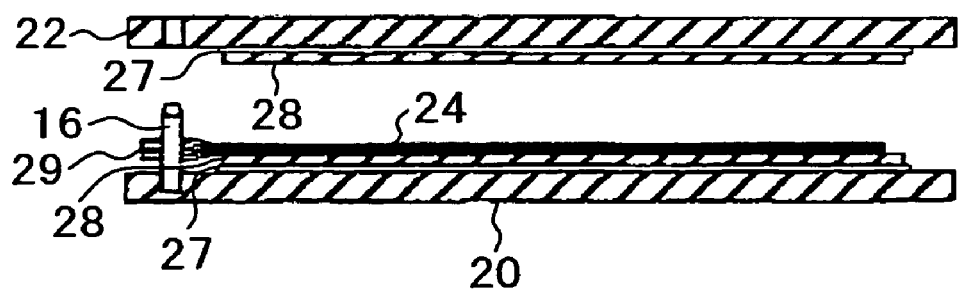
FIG. 9 is a longitudinal sectional view taken along the line A–A' in FIG. 8.

In this primary heat press, it is desirable to avoid deformation of the layer sheets in the vicinity of the positioning pins or the reference holes, thereby assuring the collation accuracy in the secondary collation of the outermost layer sheet. More specifically, this is for example done as shown in FIG. 8 and FIG. 9. FIG. 8 is a perspective view showing a modification of the layered structure using the above-mentioned primary collate-press layer sheets 24. FIG. 9 is a longitudinal sectional view taken along the line A–A' in FIG. 8.

In this example, similarly to the layer sheets 24 in FIG. 4B, they have two round holes 15a and one ellipse hole 15c, and the positioning pins 16 are fitted in the ellipse hole 15c and the round holes 15a on the outside. The above-mentioned layer sheets 24 overlie a thermally conductive rubber sheet 27 having a thickness of about 0.5 mm and a mirror finished surface plate 28 made of stainless steel, which are formed on the lower plate member 20. As shown in FIG. 9, the thermally conductive rubber sheet 27 and the mirror finished surface plate 28 are not formed in portions having a width of about 5 to 25 mm, which include the round holes 15a and the ellipse hole 15c. On the above-mentioned layer sheets 24, a mirror finished surface plate 28 made of stainless steel and a thermally conductive rubber sheet 27, which have the same construction, are layered in this order, and an upper plate member 22 is further layered thereon, thereby forming a non-heat-press portion 29 in the portions having a width of about 5 to 25 mm, which include the round holes 15a and the ellipse hole 15c.

If heat press is performed using the above-mentioned press plate to the layered structure composed of this construction, the non-heat-press portion 29, because of the space existing above and below it, does not contact the lower plate member 20 and the upper plate member, so that no hot press is done. This ensures the collation accuracy in the secondary collation of the outermost layer sheet, as previously described.

Figure 10:
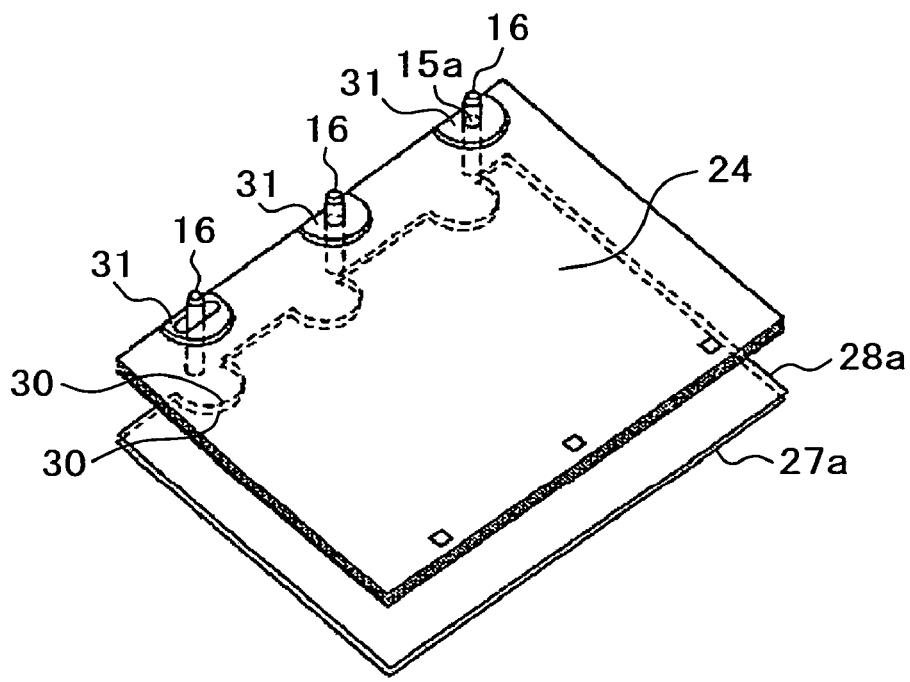
FIG. 10 is a perspective view showing another layered structure different from FIG. 8 or FIG. 9.

FIG. 10 is a perspective view showing a layered structure for preventing deformation due to heating in the vicinity of reference holes, which is different from FIG. 8 and FIG. 9. Layer sheets, and the thermally conductive rubber sheet and the mirror finished surface plate in FIG. 9 are shown in their modified state.

In this example, the size of a thermally conductive rubber sheet 27a and a mirror finished surface plate 28a is the same as the plate member, and notches 30 are formed in a circular arc at positions corresponding to the surroundings of the above-mentioned two round holes 15a and the above-mentioned one ellipse hole 15c, and the layer sheets 24 are layered thereon. Also in this example, sector non-heat-press portions 31 of the layered sheets 24, which correspond to the notches 30, do not contact both plate members because of the space existing above and below the non-heat-press portions 31, so that no heat press is done. This ensures collation accuracy in the secondary collation of the outermost layer sheet.

Figure 11:
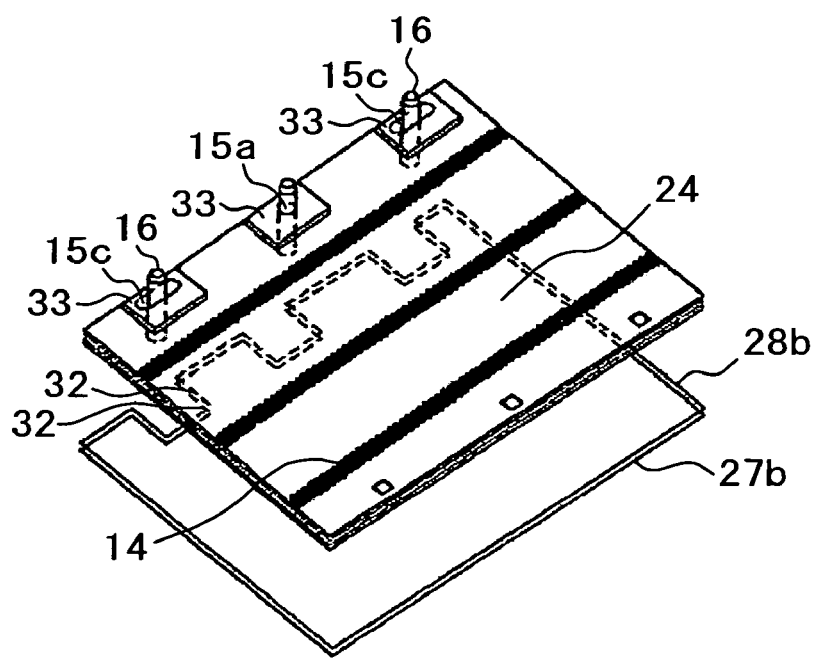
FIG. 11 is a perspective view showing a still another layered structure.

FIG. 11 is a perspective view showing still another layered structure for preventing deformation. In this example, in place of notches having a circular arc shape in FIG. 10, square notches 32 are formed at positions corresponding to the surrounds of the round hole 15a and the ellipse holes 15c in the thermally conductive rubber sheet 27b and the mirror finished surface plate 28b, and the layer sheets 24 are layered thereon. Also in this example, the square non-heat-press portions 33 of the layer sheets 24, which correspond to the notches 32, do not contact both plate members because of the space existing above and below the non-heat-press portions 33, so that no heat press is done. This ensures collation accuracy in the secondary collation of the outermost layer sheet.

Figure 12:
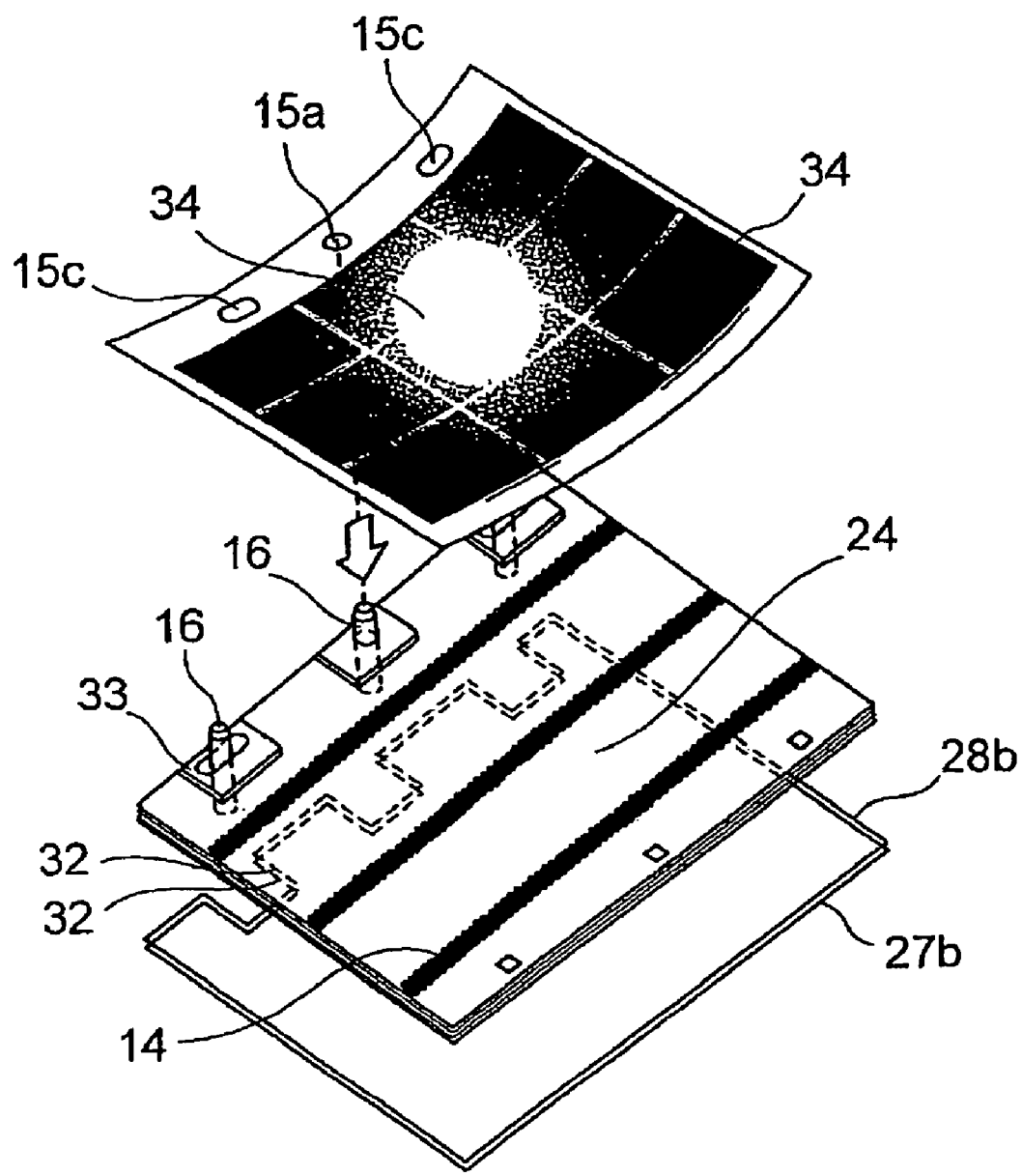
FIG. 12 is a perspective view showing a procedure of performing a secondary collation of an outermost layer sheet to the primary collate-press layer sheet of FIG. 11.

FIG. 12 is a perspective view showing a procedure of a secondary collation of an outermost layer sheet 34 such as a design pattern sheet, a printed layer sheet, a magnetic stripe shielding sheet or a thermal transfer sheet, to the primary collate-press layer sheets 24 in FIG. 11.

As shown in FIG. 12, centering is done by having the outermost layer sheet 34 approach from above the layer sheets 24 in which the non-heat-press portions 33 are formed at positions corresponding to the square notches 32, and fitting the round hole 15a at the center of the outermost layer sheet 34 into the positioning pins 16 fitted in the round holes 15a at the center of the layered sheets 24. Subsequently, using the round holes 15a at the center as a reference, the positioning pins 16 are fastened to the ellipse holes 15c on both sides. Thereby, the outermost layer sheet 34 is subjected to secondary collation relative to the primary collate-press layer sheets 24.

Figure 13:
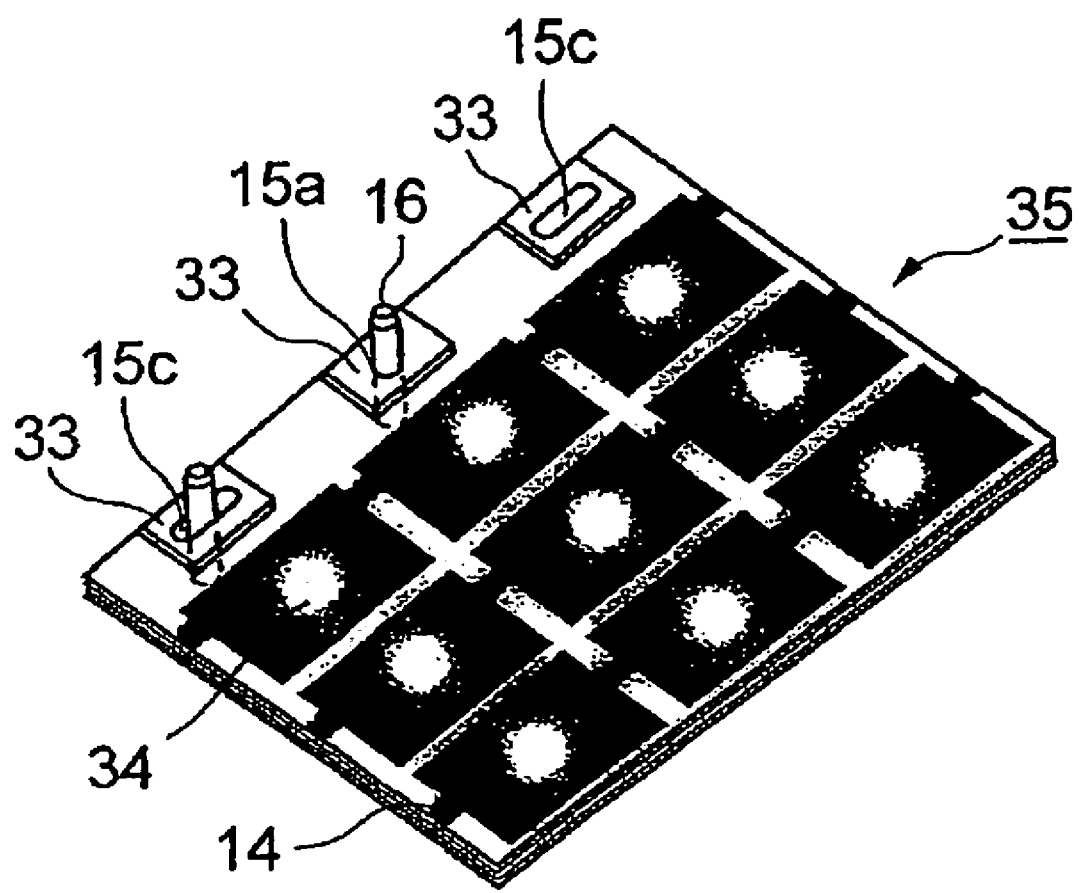
FIG. 13 is a perspective view showing a plastic sheet having a set of plastic cards containing nine pieces.

If heat press is performed to the primary collate-press layer sheets 24 and the outermost layer sheet 34 so collated, a plastic sheet 35 having a set of plastic cards containing nine pieces (corresponding to the alphanumeric character C2 in FIG. 38) is manufactured as shown in FIG. 13.

Figure 14:
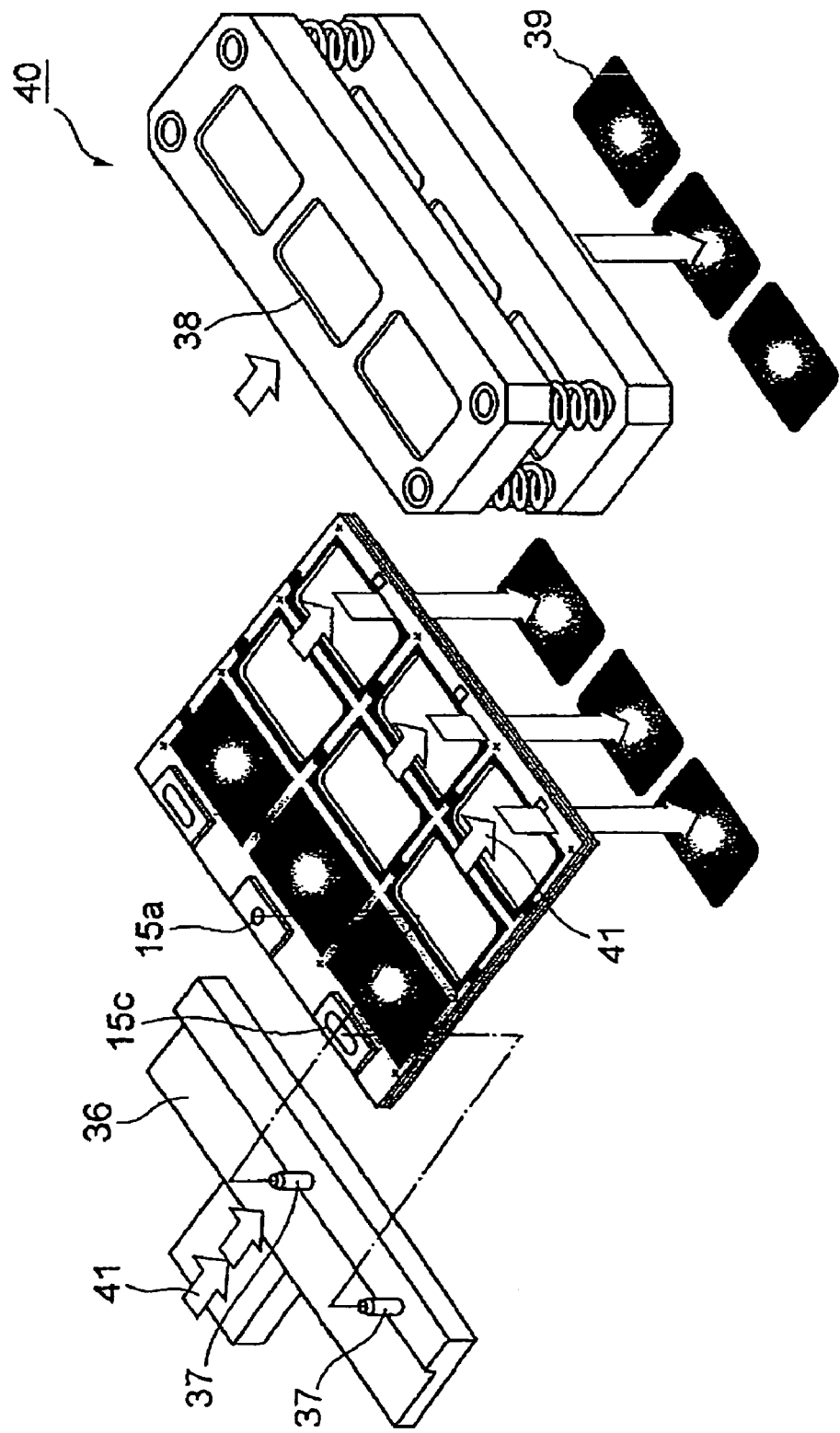
FIG. 14 is a perspective view showing a procedure of punching a plastic sheet into individual IC cards.

Subsequently, the plastic sheet 35 is punched in individual IC cards in a procedure shown in FIG. 14.

The plastic sheet 35, to which the secondary collation and the secondary heat press (a secondary laminate) have been completed, can be punched by using the round holes and the ellipse holes used for collation.

The pitch between a pair of collation pins 37 fitted in a card feed unit 36 equals to the pitch between the reference holes of either the above-mentioned round holes 15a or the ellipse holes 15c. In the example shown in FIG. 14, the pair of collation pins 37 are fitted and secured to the round hole 15a at the center and the ellipse hole 15c on the left in the plastic sheet 35. This plastic sheet 35 is supplied between both molds of a punching unit 40 consisting of an upper mold 38 and a lower mold 39, by the card feed unit 36, and is forwarded by the pitch shown by the arrow 41 in FIG. 14. Thereby, three desired IC cards are manufactured by one punching, as shown in FIG. 14.

Thus, in accordance with the first embodiment, when plastic cards such as IC cards and the like are manufactured by collating and welding a plurality of card component sheets, some of a plurality of reference holes formed in the card component sheets are constructed so as to permit relatively free position correction of the pins to be fitted in such reference holes. Thereby, the respective card component sheets can be collated and welded without substantially causing distortion and twisting therein, and it is therefore able to manufacture plastic cards having no distortion and twisting. This avoids print blur and the like, thereby upgrading the appearance, and also prevents mechanical strength from lowering due to residual stress.

Further, although in the case of IC cards mounting an IC chip, an outermost layer sheet might be deformed by following a shape of the IC chip, thereby distorting a print pattern, it is capable of coping with such a case by dividing collation and heat press into primary and secondary ones, and separately performing the collation and the heat press of the outermost layer sheet.

Further, misreading of the top surface and the back surface in collation is avoidable by asymmetrically forming a plurality of reference holes to be formed in card component sheets.

Second Embodiment

A second embodiment of the present invention will be described hereinafter.

This embodiment describes a card manufacturing apparatus for implementing the heat press process described in the first embodiment and a specific example of plates for heat press used for this apparatus.

<Overall Construction of the Apparatus>

Figure 15:
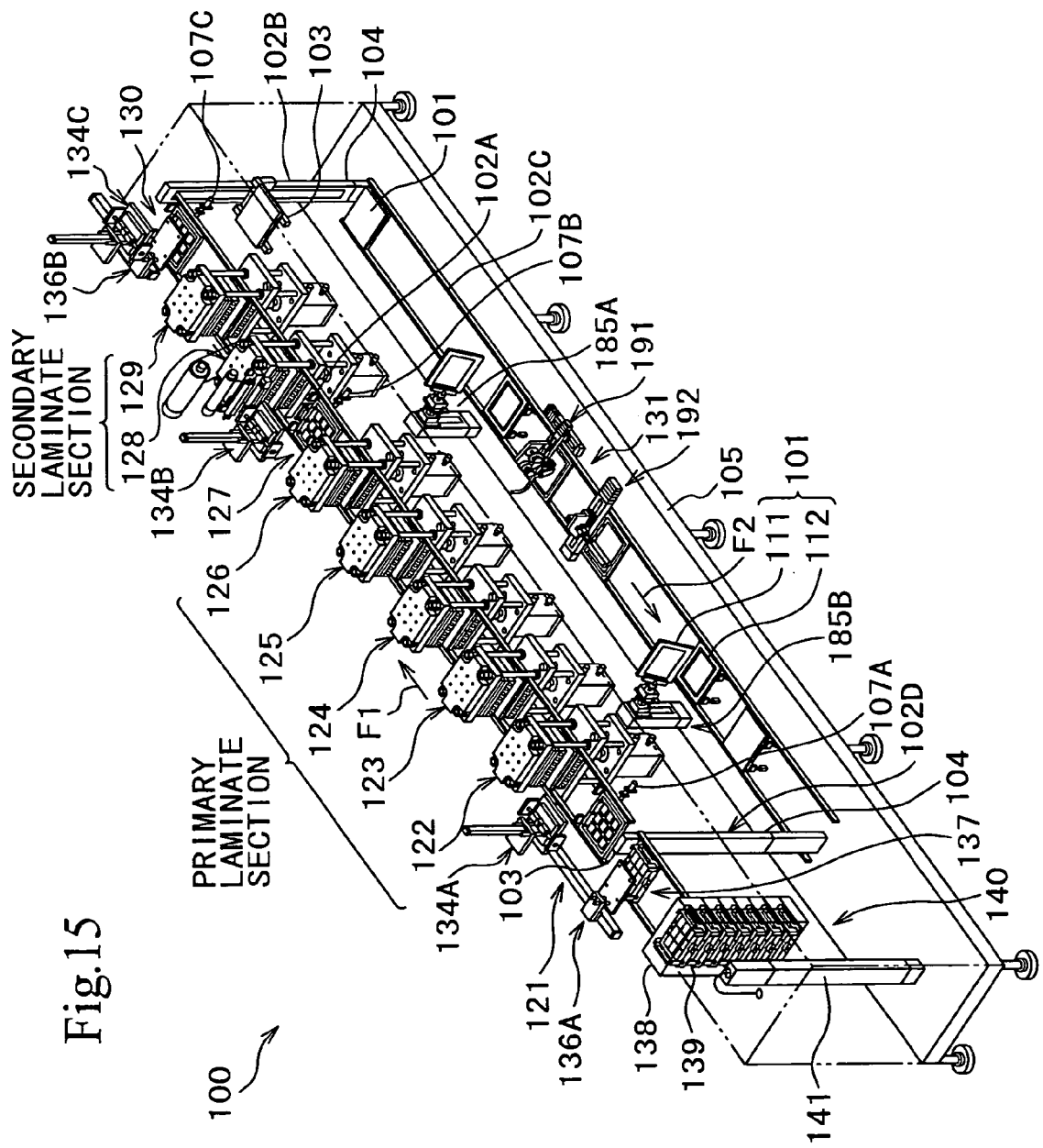
FIG. 15 is a perspective view showing the whole of a card manufacturing apparatus 100 according to a second embodiment of the present invention.

FIG. 15 is a perspective view showing schematically the whole of a card manufacturing apparatus applied to this embodiment.

A card manufacturing apparatus 100 is a secondary apparatus for welding to integrate rectangular various card component sheets (hereinafter generally referred to as a "card component sheet C") of multi-leaves size (about A4 size) corresponding to nine pieces of non-contact type IC cards as described with reference to FIG. 38.

The card manufacturing apparatus 100 has a plurality of stations for performing a variety of processing while circulating, between two stages of upper and lower transfer paths, a carrier plate (plate for heat press) 101 consisting of a pair of upper and lower plate members 111 and 112 for pressing the card component sheets C. The carrier plate 101 is transferred to a downstream side by feed action station by station.

Each station comprises a card component sheet supply section 121, a primary laminate section consisting of a first preheat press portion 122, a second preheat press portion 123, a heat press portion 124, a first cooling press portion 125 and a second cooling press portion 126, a secondary laminate sheet supply section 127, a secondary laminate section consisting of a secondary heat press portion 128 and a secondary cooling press portion 129, a sheet extraction section 130, and a cleaning section 131. The details of these will be described later.

A transfer path for circularly transferring the carrier plate 101 is provided with two stages of upper and lower linear transfer rails 102A and 102C, which respectively transfer the carrier plate 101 in one direction. The transfer rails 102A and 102C on the respective stages are composed of a pair of right and left rail sections. In each rail section, there is disposed a roller conveyor 106 (FIG. 21) for supporting both side edge portions of the carrier plate 101. Respective rollers of the roller conveyor 106 rotate synchronously by chain driving (not shown), and transfers the carrier plate 101 along the transfer rails 102A and 102C and in directions shown by the arrows F1 and F2 (FIG. 15).

The transfer of the carrier plate 101 between the transfer rail 102A on the upper stage and the transfer rail 102C on the lower stage is executed by elevating units 102B and 102D for making connection between the end portions of the transfer rails 102A and 102C.

The respective elevating units 102B and 102D have the same construction and are provided with a pair of support arms 103 for supporting a lower surface of the carrier plate 101, and an electric actuator 104 for elevating and lowering the support arms 103.

The transfer rails 102A and 102C and the elevating units 102B and 102D are placed on respective frame sections of a rack 105, which is shown in simplified form in FIG. 15.

<Carrier Plate Construction>

The details of the construction of the carrier plate 101 will next be described by referring to FIG. 16 to FIG. 18B.

Figure 16:
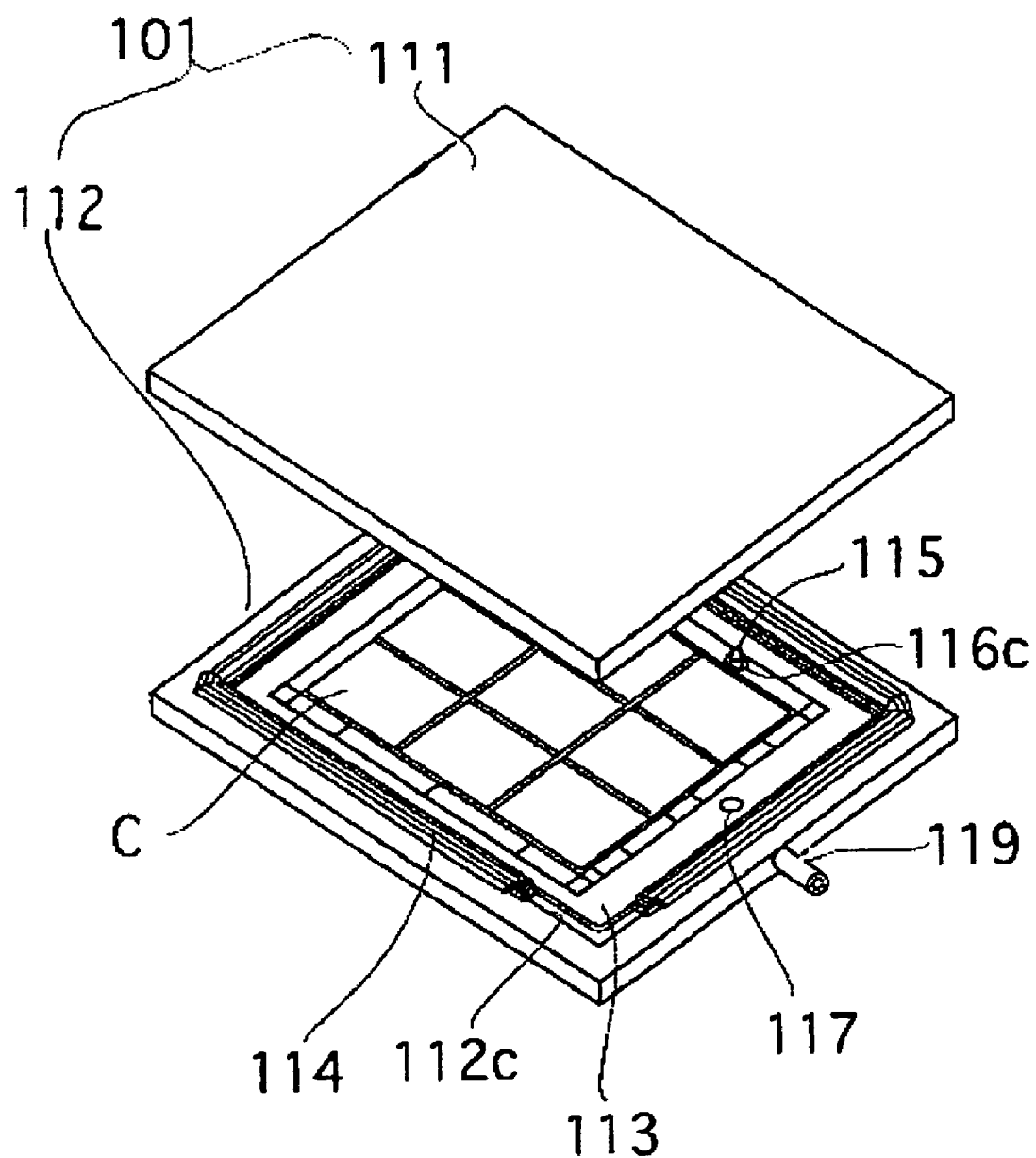
FIG. 16 is a perspective view showing a construction of a carrier plate 101 as a plate for heat press, and shows a state in which an upper plate member 111 is separated from a lower plate member 112.
Figure 17:
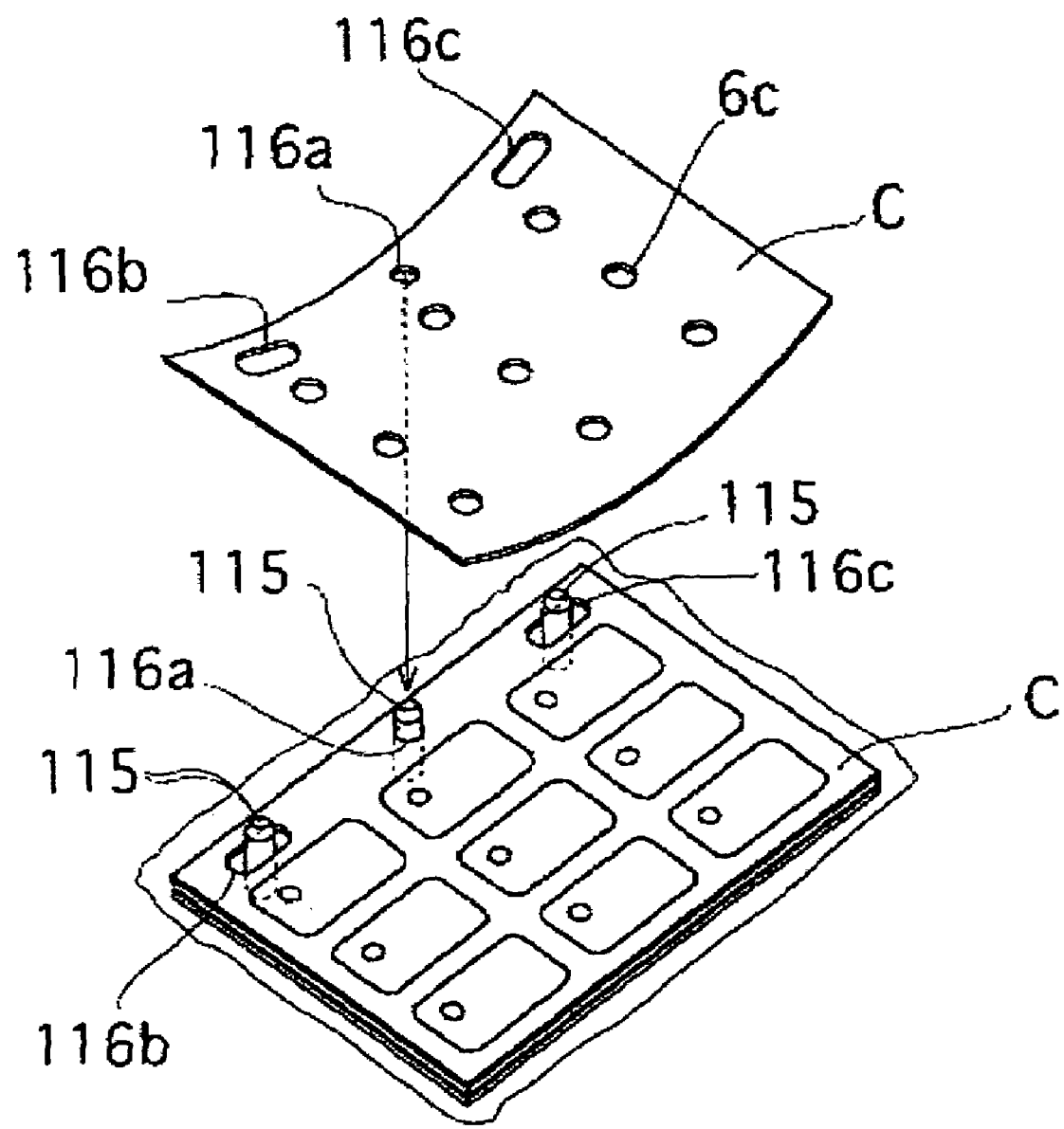
FIG. 17 is a perspective view explaining a process of collating and layering various card component sheets to a pressing surface of a lower plate member.
Figure 18A:
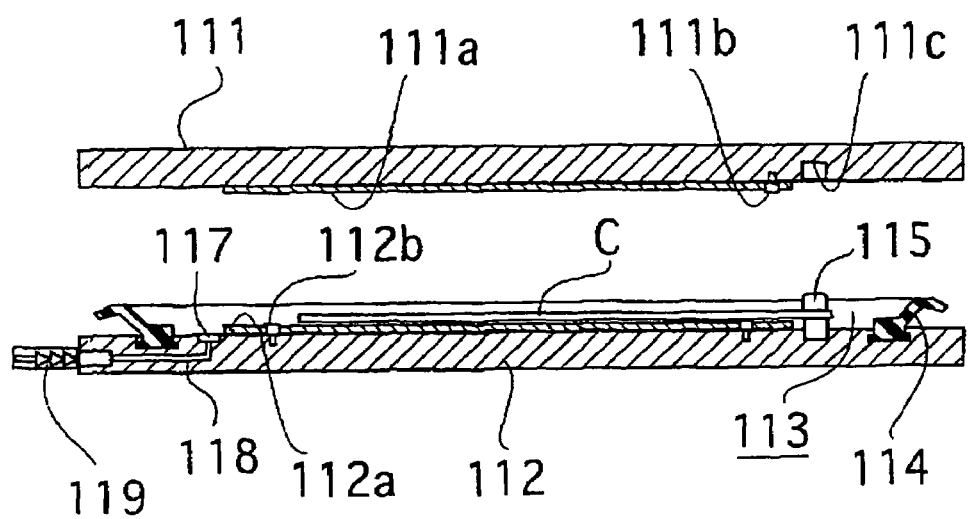
FIGS. 18A and FIG. 18B are longitudinal sectional views showing a construction the carrier plate 101.
Figure 18B:
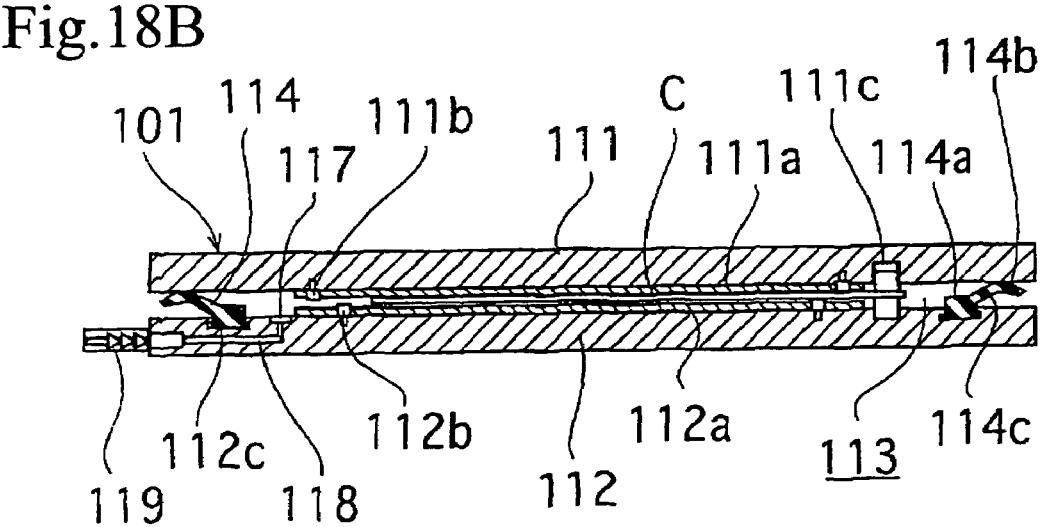

Specifically, FIG. 16 is a perspective view individually showing the upper plate member 111 and the lower plate member 112 constituting the carrier plate 101. FIG. 17 is a perspective view of the card component sheets C to be collated and layered on the pressing surface of the lower plate member 112. FIG. 18A and. FIG. 18B are side sectional views of the carrier plate 101, and FIG. 18A shows a state in which the upper plate member 111 and the lower plate member 112 are separated to each other, and FIG. 18B shows a state in which the upper plate member 111 and the lower plate member 112 are overlapped with each other.

The carrier plate 101 is formed by a pair of upper and lower plate members 111 and 112, which are composed of a metal material having good thermal conductivity such as copper, brass, aluminum alloy or the like. A circular sealing member 114 defining a sheet storing section 113 is fitted between the upper plate member 111 and the lower plate member 112. Although the sealing member 114 may be fitted to either of the upper and lower plate members 111 and 112, it is fitted to the lower plate member 112 side in the present embodiment.

The details of the sealing member 114 will be described later.

The sheet storing section 113 is defined between the pressing surface of the upper plate member 111, the pressing surface of the lower plate member 112, and the sealing member 114, and is a region where card component sheets C are stored. Three positioning pins 115 for collating the respective card component sheets C are disposed vertically on the pressing surface of the lower plate member 112, which corresponds to the sheet storing section 113.

The individual card component sheets C are, as shown in FIG. 17, provided with three reference holes 116a to 116c through which these positioning pins 115 pass. In the second embodiment, a reference hole 116a at the center is made as a round hole having substantially the same shape as the positioning pin 115, and reference holes 116b and 116c on both sides are made as an ellipse hole, as in the above-mentioned first embodiment described with reference to FIG. 1A.

The positioning pin 115 passing through the reference hole 116a corresponds to the "first positioning pin" of the present invention, and the positioning pin 115 passing through the reference holes 116b and 116c correspond to the "second positioning pin" of the present invention.

A degassing hole 117 is formed in a region, which is located within the sheet storing section 113 on the lower plate member 112 and is not covered with the card component sheets C. The degassing hole 117 connects to one end of an exhaust passage 118 formed in the inside of the lower plate member 112. A check valve apparatus 119, which prohibits outside air from entering into the sheet storing section 113, is connected to the other end of the exhaust passage 118 (FIG. 18A and FIG. 18B).

The check valve apparatus 119 has a function of allowing the flow of air from one end of the exhaust passage 118 (i.e., the degassing hole 117) to the other end, and prohibiting the reverse flow. It is further provided with a function of allowing the flow of air to the sheet storing section 113 side (i.e., release function) by releasing a seating state of a valve body on the basis of mechanical and electrical operations from the exterior, or by releasing a release valve.

In the second embodiment, there is used a check valve apparatus of a system for opening the valve by mechanically pushing a seat, concretely, a self locking coupler (product name) IN-334-79, manufactured by SMC Co., Ltd.

In the carrier plate 101, vacuum pumping and vacuum release of the inside before and after press processing are performed via the above-mentioned check valve apparatus 119. In the second embodiment, as shown in FIG. 15, nozzle operating cylinders 107A to 107C, which perform vacuum pumping/vacuum release in the inside of the carrier plate 101 by the connection to the check valve apparatus 119, are disposed at respective corresponding positions in the supply section 121, the secondary laminate sheet supply section 127 and the sheet extraction section 130.

Specifically, it is constructed such that the nozzle operating cylinder 107A can perform only vacuum pumping action, the nozzle operating cylinder 107B can perform both of vacuum pumping action and vacuum release action, and the nozzle operating cylinder 107C can perform only vacuum release action.

Referring to FIG. 18A and FIG. 18B, mirror finished surface plates 111a and 112a are attached to respective internal surfaces of the upper plate member 111 and the lower plate member 112, which form a pressing surface of the card component sheets C. Vises 111b and 112b for attaching the mirror finished surface plates 111a and 112a to the internal surface sides of the plate members 111 and 112 are disposed at positions that are offset from each other. Additionally, it is set such that the height of their respective heads is smaller than the space between the mirror finished surface plates 111a and 112a at the time of pressing of the card component sheets C.

In addition, on the internal surface side of the upper plate member 111, a clearance hole 111c is disposed, into which the positioning pin 115 vertically disposed on the internal surface of the lower plate member 112 enters at the time of overlapping with the lower plate member 112.

Figure 19A:
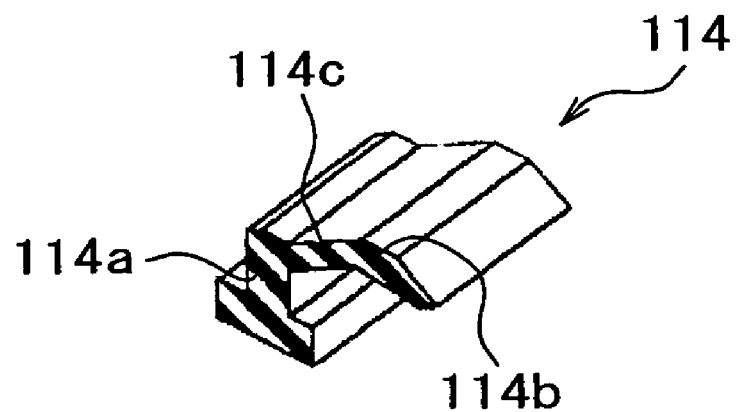
FIGS. 19A and 19B are perspective views showing a construction of a sealing member fitted to a lower plate member.
Figure 19B:
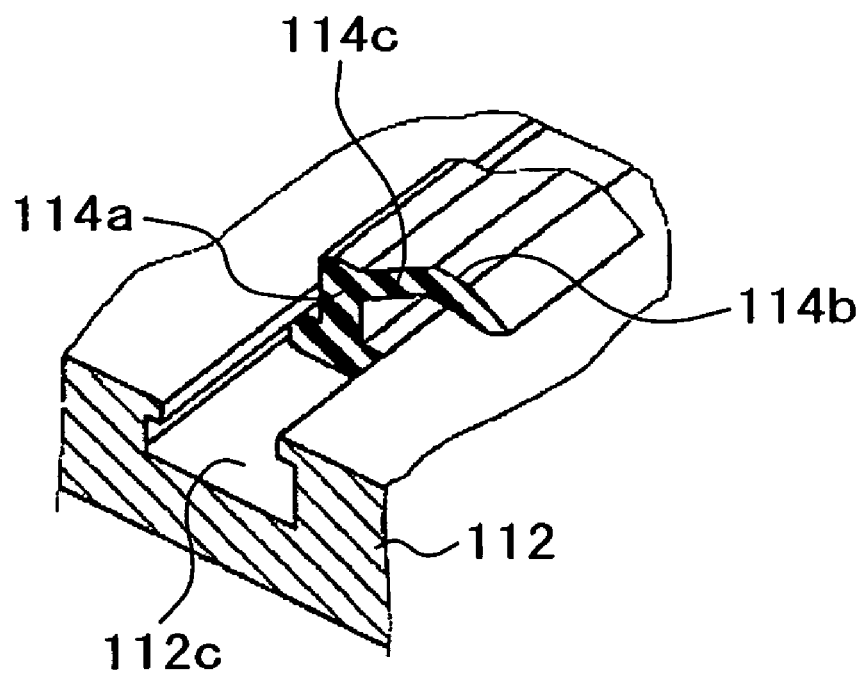

FIG. 19A and FIG. 19B shows the details of the sealing member 114. Specifically, FIG. 19A is a perspective view showing a sectional structure of the sealing member 114, and FIG. 19B is a perspective view showing a state in which the sealing member 114 is secured to the lower plate member 112.

The sealing member 114 has a base portion 114a fixed in close contact to the internal surface side of the lower plate member 112, a sealing portion 114b in close contact attaching to the internal surface side of the upper plate member 111, and a connecting portion 114c for connecting the base portion 114a and the sealing portion 114b.

The sealing portion 114 of the second embodiment is formed by, for example, silicone rubber having a rubber hardness of approximately 45° to 50°.

The base member 114a is fitted to a circular groove 112c formed on the internal surface side of the lower plate member 112, so as to establish engagement relationship with each other, thereby effecting slip-off prevention.

The sealing portion 114b extends outwardly of the base portion 114a, and an upper end thereof is elastically connected to the internal surface of the upper plate member 111.

The connecting portion 114c is constructed such that the adhesion force of the sealing portion 114b at the time of overlapping of the upper plate member 111 and the lower plate member 112 is obtainable by reaction force of elastic bending of the connecting portion 114c.

<Card Component Sheet Supply System>

The details of a supply system of card component sheets C to the card manufacturing apparatus 100 will next be described.

Figure 20:
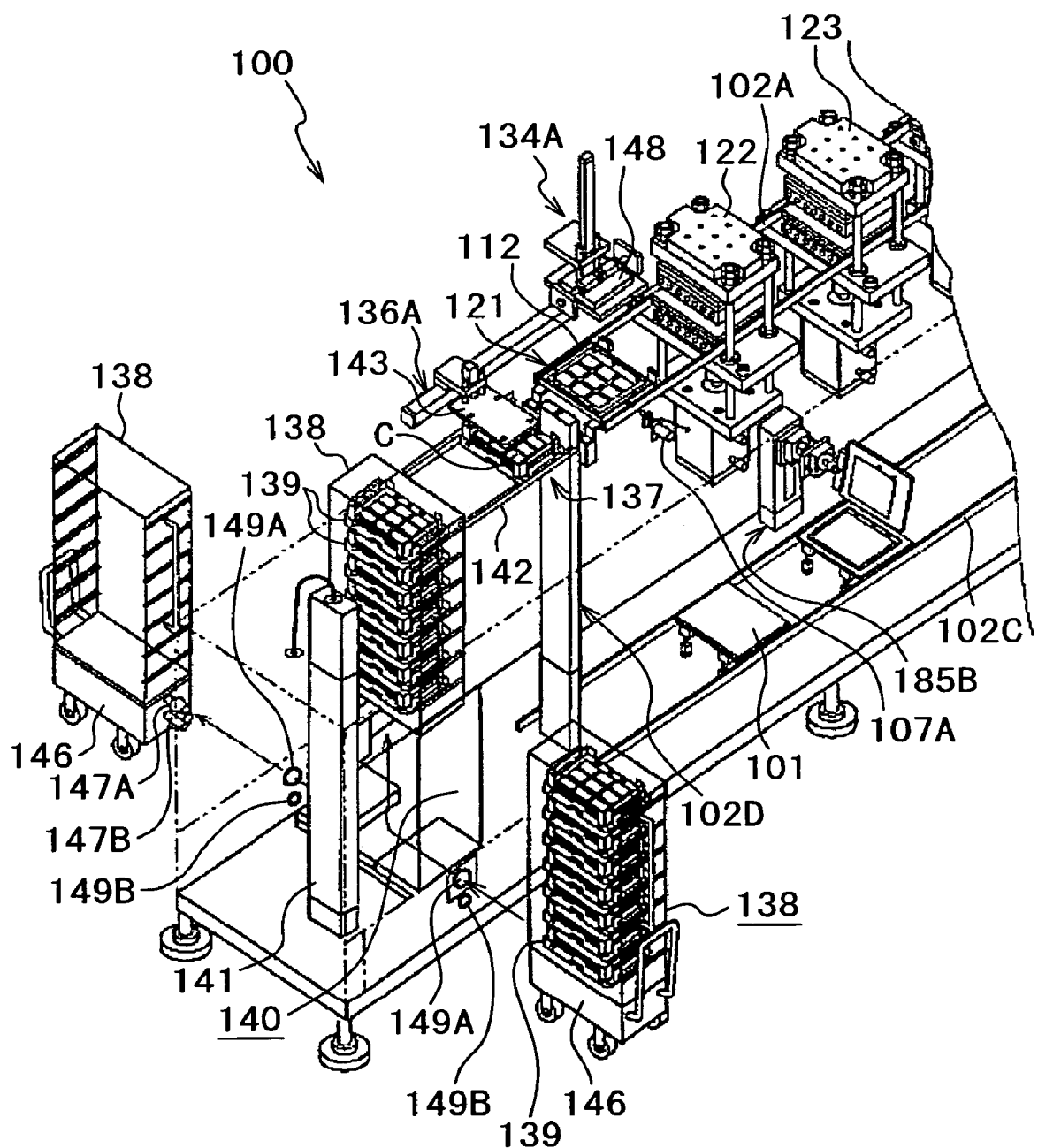
FIG. 20 is a perspective view showing surroundings of a supply section 121 of the card manufacturing apparatus 100.

FIG. 20 shows a construction of a supply section of card component sheets C in the card manufacturing apparatus 100.

A supply section 121 from which the card component sheets C are supplied to the carrier plate 101 is executed at an upper limit position of an elevating unit 102D, which corresponds to a starting end portion of a transfer rail 102A. At this position, the lower plate member 112 is held in standby with its pressing surface open, and the upper plate member 111 to be paired therewith is held above the lower plate member 112 by a plate holding unit 134A.

The plate holding unit 134A is provided with an adsorbing portion 148 for vacuum-adsorbing the upper surface of the upper plate member 111.

Figure 21:
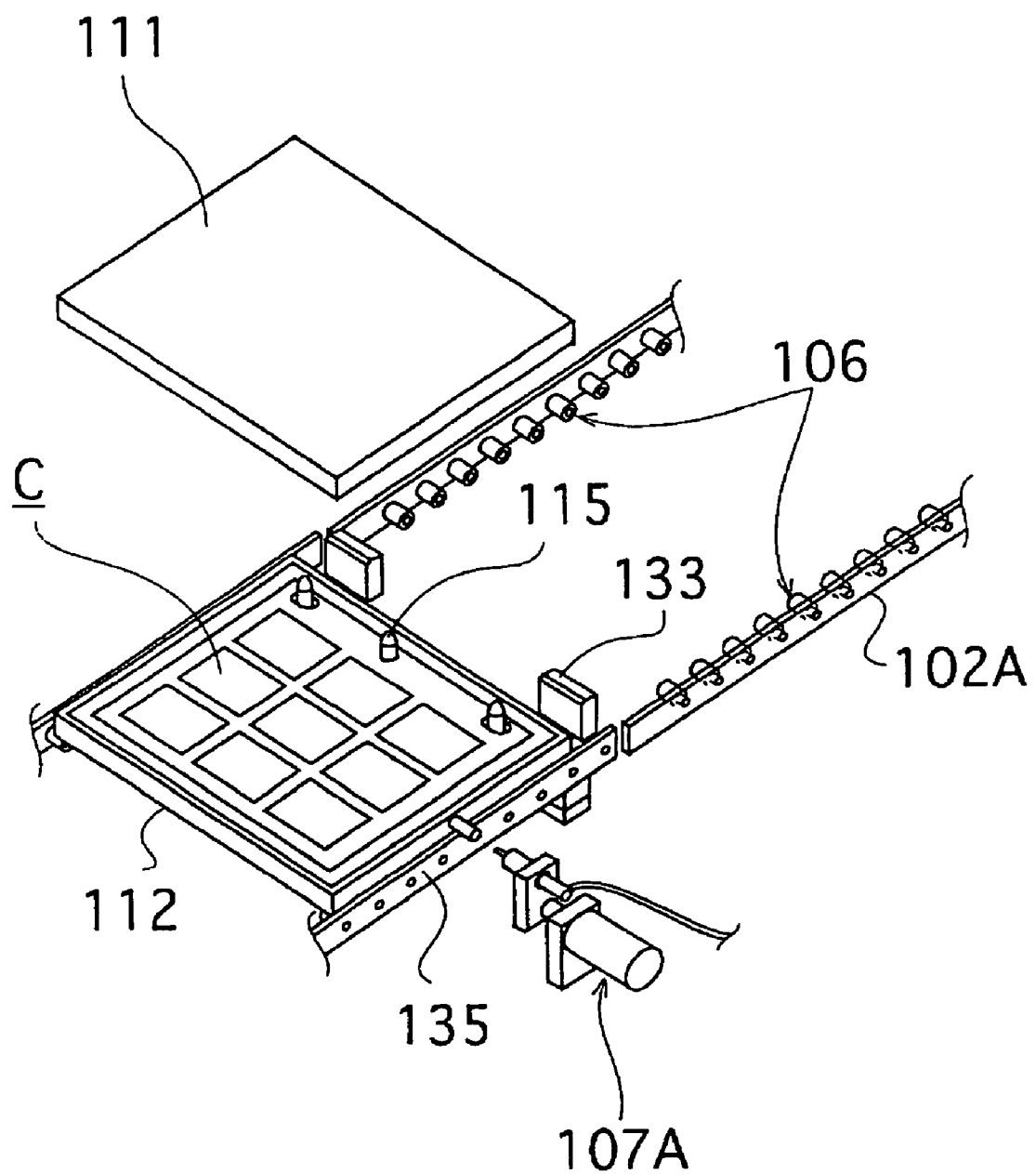
FIG. 21 is a perspective view showing the supply:section 121.

In the starting end portion of the transfer rail 102A, as shown in FIG. 21, the range corresponding to one station is formed by an independent variable pitch rail portion 135, and the distance between the rails expands and contracts during the elevation motion of the carrier plate 101 by the elevating unit 102D, thereby transferring the carrier plate 101 onto the upper surface of the rail.

Here, a rail portion which is a terminating end side of the transfer rail 102A on the upper stage, and is located in a region for transferring the carrier plate 101 to the elevating unit 102B, is also formed by a similar variable pitch rail portion.

The plate holding unit 134A adsorbs the upper plate member 111 and holds it lifted above. The lower plate member 112 is positioned on the variable pitch rail portion 135 by a plate stopper 133.

The plate stopper 133 is moved upward to a position at which it abuts the carrier plate 101, by using for example an air cylinder as a source of driving.

The plate stopper 133 is not limited to the case of disposing at positions at which it abuts the right and the left on the front surface of the carrier plate 101, as shown in FIG. 21. Only one plate stopper 133 may be disposed at a position at which it abuts the center on the front surface of the carrier plate 101.

The supply section 121 is provided with a sheet transfer unit 136A for transferring and layering card component sheets C which should be laminated to the sheet storing portion 113 of the pressing surface of the opened lower plate member 112 (FIG. 20).

The sheet transfer unit 136A is provided with a sheet adsorbing portion 143 for transferring card component sheets C from a sheet pickup portion 137, at which the card component sheets C to be layered are positioned, onto the sheet storing portion 113 of the lower plate member 112.

In the sheet pickup portion 137, a tray 139 taken out from a tray rack 138 is positioned and secured.

In the tray rack 138, the trays 139 storing various card component sheets C to be laminated are stored longitudinally in order of layering. Sheets C of the same type are stored in a single tray 139, and sheets C of the same number are stored in the respective trays 139. The individual trays 139 in the tray rack 138 are taken out in order of layering to the sheet pickup portion 137, and the sheets C are adsorbed one by one and then transferred to the lower plate member 112 by the sheet transfer unit 136A.

The tray rack 138 is set in a tray supply unit 140 in the inside of the card manufacturing apparatus 100. The tray rack 138 is movable up and down by an elevator 141, so that the respective stages housing the trays 139 are serially feed-driven to a disposing level of a guide rail portion 142 for guiding the trays 139 to the sheet pickup portion 137.

The guide of the trays 139 from the tray rack 138 to the sheet pickup portion 137 is executed by a tray guiding means (not shown) for guiding the trays 139 onto the guide rail portion 142 while retaining both side portions of the trays 139.

<Card Component Sheets>

Figure 22:
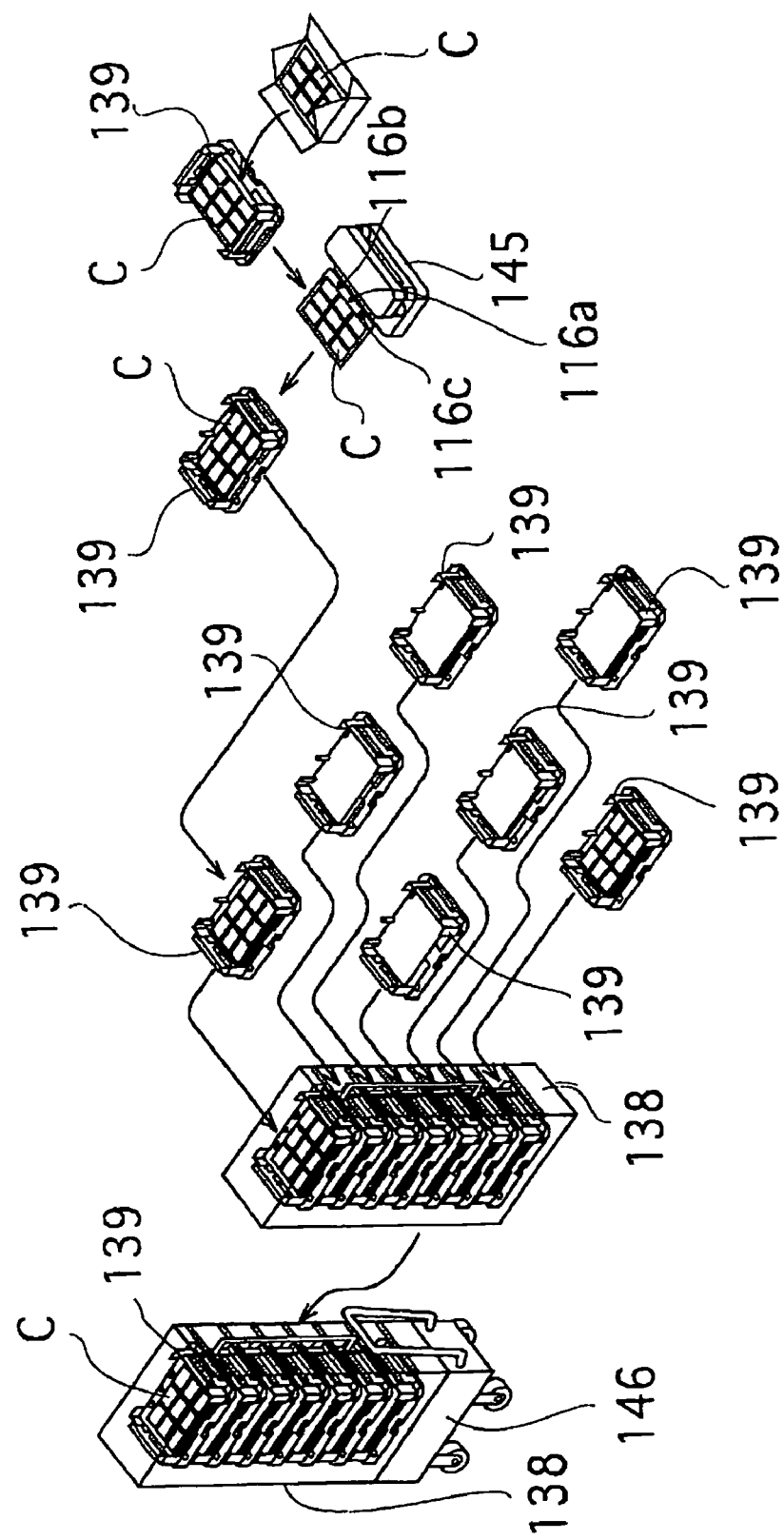
FIG. 22 is a perspective view explaining a process of preparing card component sheets C.

FIG. 22 shows a construction of trays 139 to be housed at the respective stages of the tray rack 138, and a preprocessing step of card component sheets C to be stored in the trays 139.

The card component sheets C have a size of multi-leaves size corresponding to nine cards (approximately A4 size), and the trays 139 are made of such size as to be capable of storing the sheets C in a state in which they are aligned vertically. After unpacking various card component sheets C, for example, 100 pieces are stored in their dedicated trays 139, respectively. Assuming that a basic layer construction of an IC card has for example seven layers, seven dedicated trays 139 are necessary. The housing of the trays 139 into the tray rack 138 is executed in order of layering of the card component sheets C onto the lower plate member 112.

In the card component sheets C, three reference holes 116a to 116c, which comprises the round hole and the ellipse hole shown in FIG. 17, are formed by a reference hole punching unit 145. By forming the reference holes 116a to 116c at their respect corresponding positions in the individual card component sheets C, the collation of the sheets C is performed by having the positioning pins 115 of the lower plate member 112 pass through these reference holes. As a result, the relative positioning in a direction of layering of the individual sheets C is executed, thereby obtaining desired collation accuracy.

The tray rack 138 so constructed is mounted on a dedicated carriage 146 and then charged into the supply unit 140 of the card manufacturing unit 100 (FIG. 20). After two guide rods 147A and 147B disposed vertically on the front surface of the carriage 146 are fitted in guide holes 149A and 149B formed in the outer wall surface of the supply unit 140, the tray rack 138 is guided into the supply unit 140 and then set to the elevator 141.

Of the two guide rods 147A and 147B, the guide rod 147A is to have the carriage 146 connected to and integrated with the apparatus 100, and the other guide rod 147B is to perform high accuracy positioning between the carriage 146 and the apparatus 100.

When the tray rack 138 housing empty trays 139 is discharged to the outside of the apparatus, it is transferred onto the carriage 146 set to the outside wall surface on the side which is opposite the above-mentioned charging side.

<Primary Laminate Section>

Referring to FIG. 15, the card manufacturing apparatus 100 of the second embodiment has, as respective press sections constituting a primary laminate section, a first preheat press portion 122, a second preheat press portion 123, a heat press portion 124, a first cooling press portion 125 and a second cooling press portion 126.

The first preheat press portion 122 and the second preheat press portion 123 raise the temperature of the carrier plate 101 up to the vicinity of press temperature in the heat press portion 124, which is a subsequent stage.

The heat press portion 124 heat-presses the carrier plate 101, for example, at a press pressure of 800 kg to 1500 kg per card and at 120° C. to 190° C.

The first cooling press portion 125 is a press portion for rapidly cooling or slowly cooling the carrier plate 101 after being subjected to heat press, and the second cooling press portion 126 cools the carrier plate 101 to the vicinity of room temperature.

Figure 23:
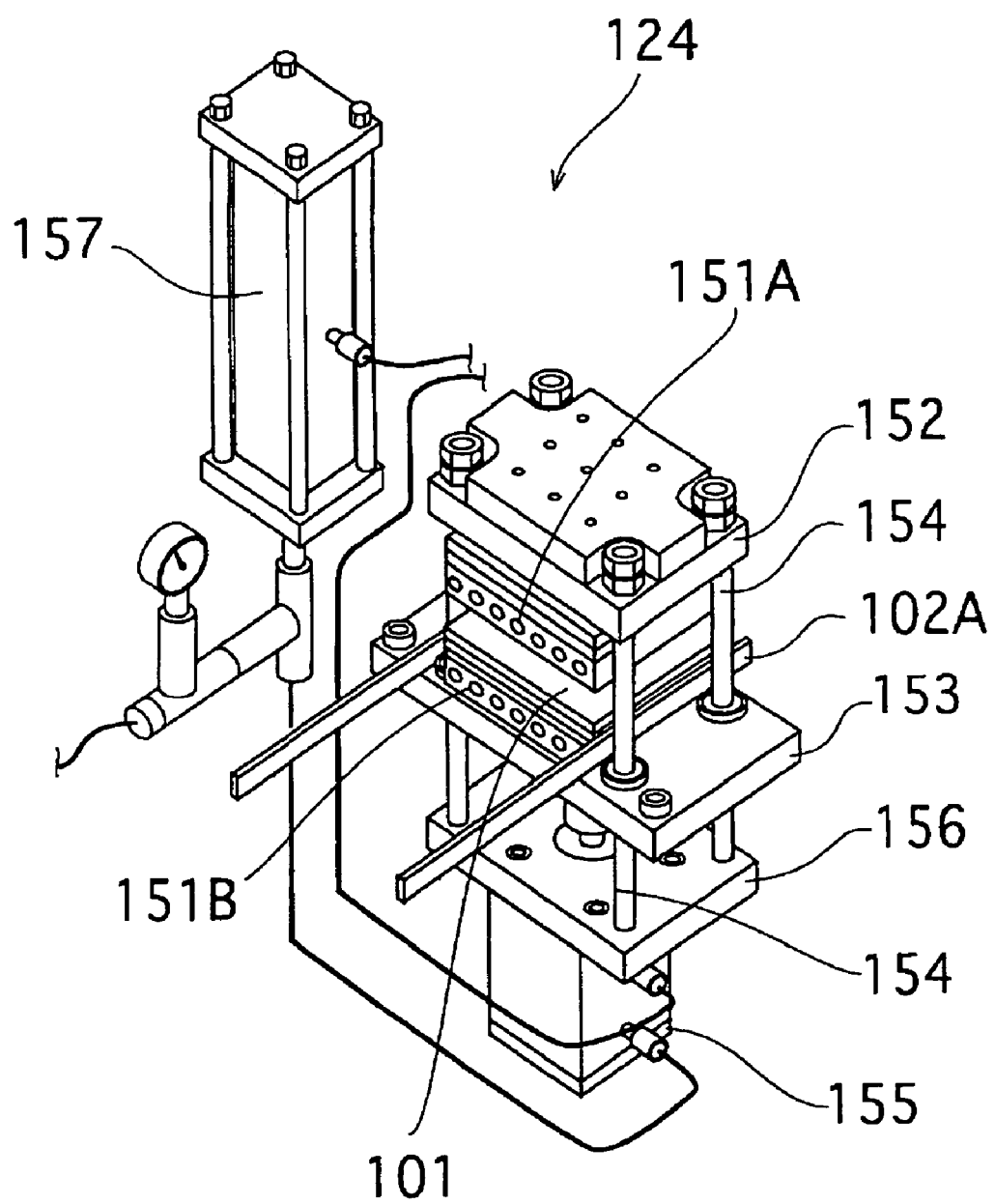
FIG. 23 is a perspective view showing a construction of a primary heat press portion.

The preheat press portions 122 and 123, and the heat press portion 124 have respectively a similar construction. For example, FIG. 23 is a perspective view showing a construction of the heat press portion 124.

The heat press portion 124 has a pair of upper and lower heated platens 151A and 151B each incorporating a heater, and a transfer rail 102A extends such that the carrier plate 101 is transferred between the heated platens 151A and 151B.

The heated platen 151A on the upper side is secured via a heat insulating plate to a fixed support plate 152, and the heated platen 151B on the lower side is fixed via a heat insulating plate to a movable support plate 153, which is vertically movable relative to the fixed support plate 152.

The vertical movement of the variable support plate 153 is guided by four guide axes 154. The upper end of the guide axis 154 is secured to the fixed support plate 152, and the lower end of the guide axis 154 is secured to a support plate 156 for supporting a press driving section 155.

The fixed support plate 152 and the support plate 156 are set in the respective frame portions of the apparatus rack 105 (FIG. 15).

In the second embodiment, the press driving portion 155 is disposed on the lower heated platen 151B side. By the driving of the press driving portion 155, the heated platen 151B is elevated and the carrier plate 101 is lifted upward, and by a further elevation of the heated platen 151B, the carrier plate 101 is pressed between the upper and lower heated platens 151A and 151B.

As a source of driving 157 of the press driving portion 155, the second embodiment employs an air-hydraulic converting booster (air over hydraulic booster) in order to attain miniaturization of the source of driving and saving of the space thereof, and facilitating of control.

Figure 24:
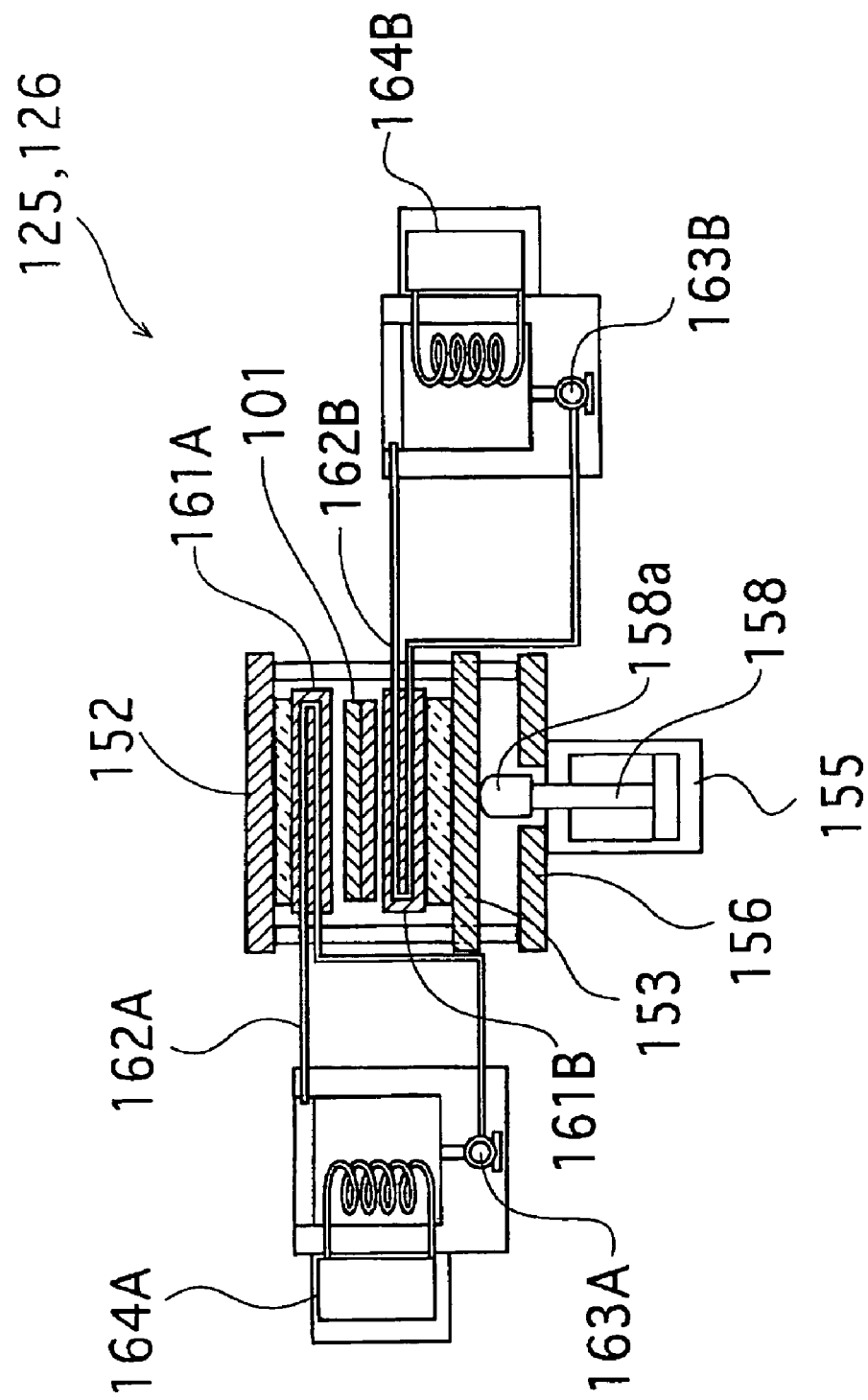
FIG. 24 is a longitudinal sectional view showing schematically a construction of a primary cooling press portion.

On the other hand, FIG. 24 shows schematically the structure of the cooling press portions 125 and 126.

Cooled platens 161A and 161B are secured to the fixed support plate 152 and the movable support plate 153, respectively, and a plate for heat press 101 is transferred between the cooled platens 161A and 161B. Chilled water circulating passages 162A and 162B are embedded in the cooled platens 161A and 161B, respectively, and chilled water of 15° C. to 20° C. is circulated by cooling units 164A and 164B, which incorporate circulating pumps 163A and 163B, respectively.

Heat press sections 122 to 124 and cooling press sections 125 and 126 are respectively provided with an independent press driving portion 155, so that the respective press sections operate independently.

A tip portion 158a of a driving rod 158 for transmitting the driving force of the press driving portion 155 to the variable support plate 153 has a curved surface shape as shown in FIG. 24. This is to reduce the interference with the guide axis 154 so that the variable support plate 153 is able to smoothly move up or down.

<Secondary Laminate Section>

Figure 25:
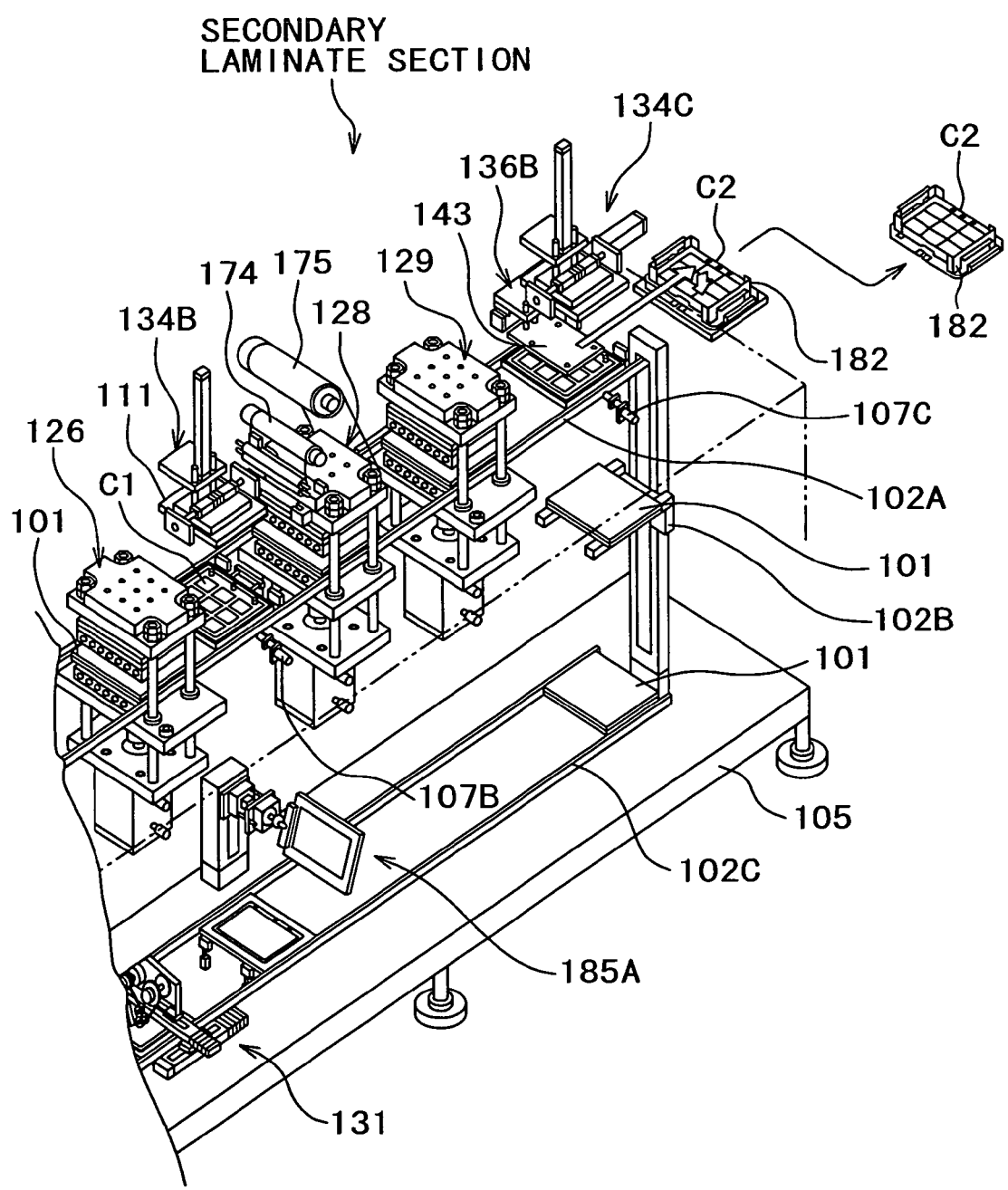
FIG. 25 is a perspective view showing a construction of a secondary laminate portion and a sheet extraction section 130 in the card manufacturing apparatus 100.

A secondary laminate section is, as shown in FIG. 25, made up of a secondary heat press portion 128 and a secondary cooling press portion 129. In the secondary laminate section, there is performed a step of laminating a card component sheet, which is the outermost layer, to a layer sheet body Cl of card component sheets C manufactured in the primary laminate section.

Figure 38:
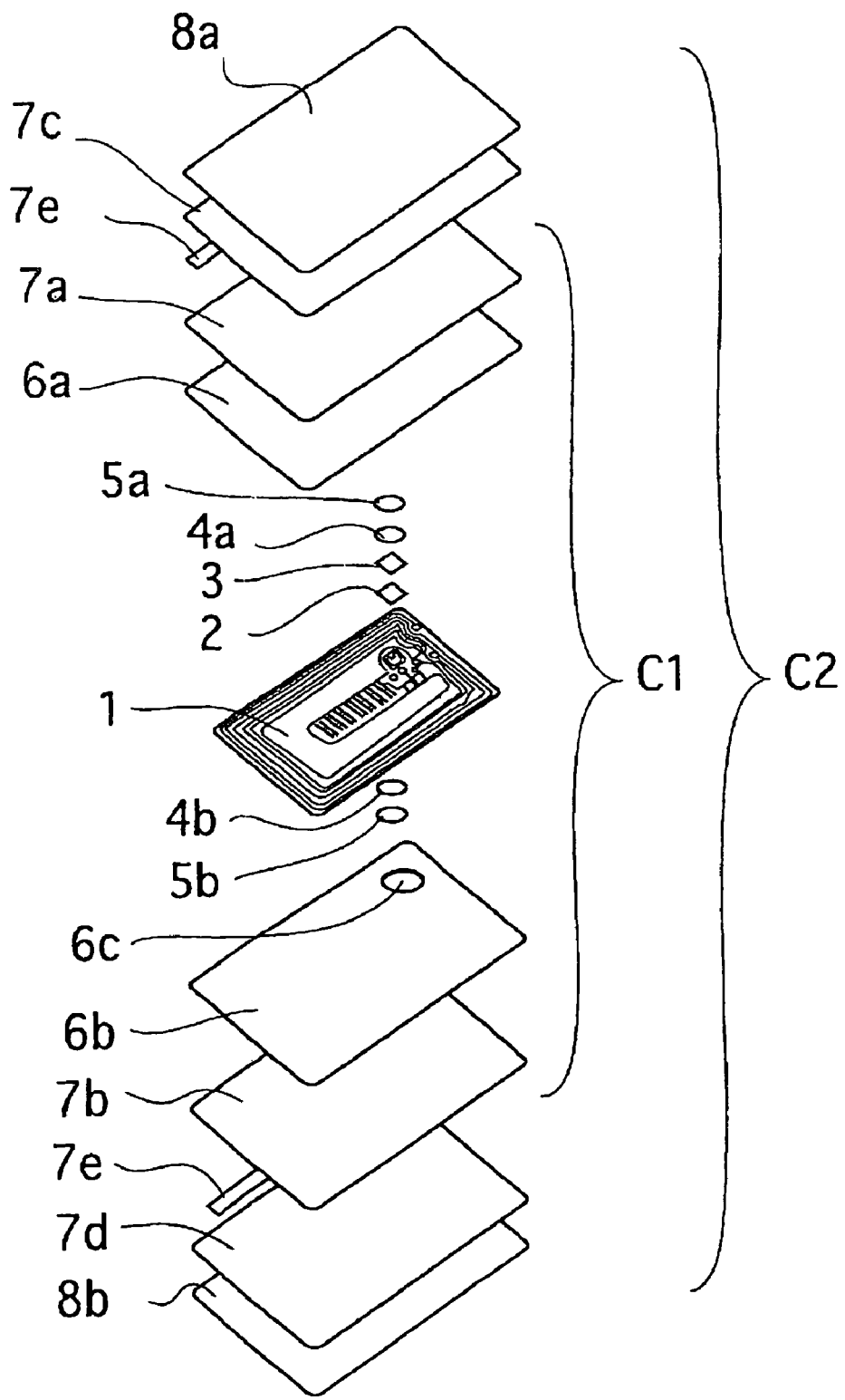
FIG. 38 is a disassembled perspective view showing an example of the construction of a non-contact type IC card.
Figure 39:
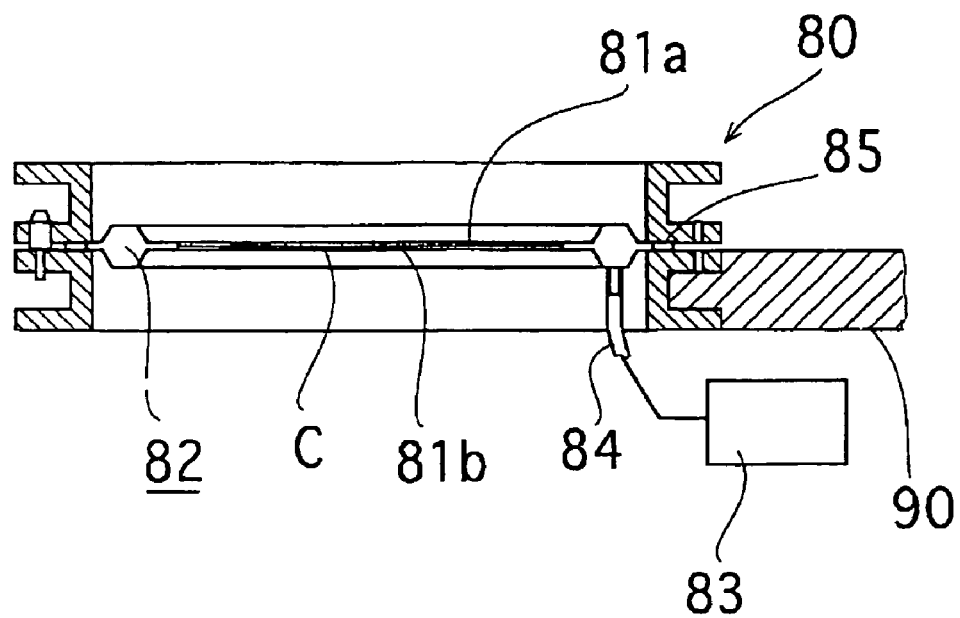
FIG. 39 is a perspective view showing a construction of a conventional plate for heat press.
Figure 40:
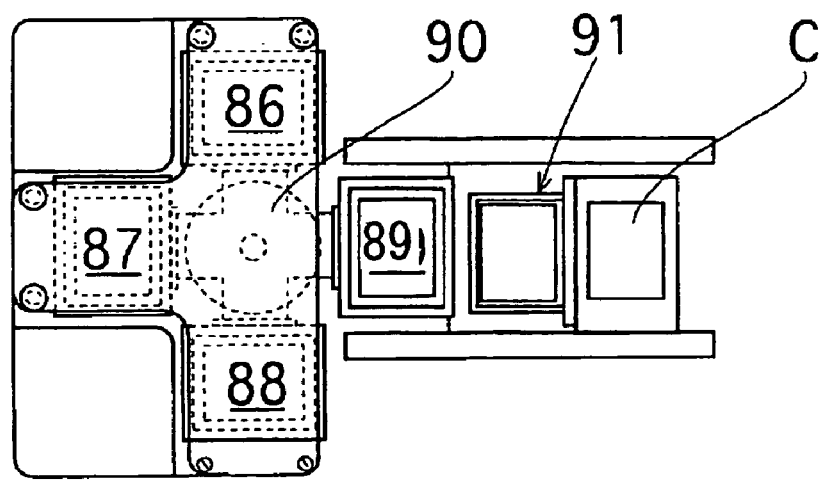
FIG. 40 is a plan view showing a conventional heat press apparatus or a card manufacturing apparatus.

Although the layer sheet body C1, strictly speaking, does not correspond to the layer sheets C1 shown by the alphanumeric character in FIG. 38, it is synonymous with the layer sheets manufactured by the primary laminate processing. This is true for layered sheets C2 manufactured by a secondary laminate processing to be described later.

Card component sheets for secondary lamination (hereinafter referred to as "secondary laminate sheets") C correspond to, for example, print ink sheets, magnetic stripes, magnetic stripe shielding sheets and the like. A secondary laminate sheet C is collated to the layer sheet body C1 in a secondary laminate sheet supply portion 127. A plate holding unit 134B for holding and lifting above the upper plate member 111 of the carrier plate 101 is disposed in the secondary laminate sheet supply portion 127. The plate holding unit 134B has the same construction as the plate holding unit 134A disposed in the supply section 121.

Figure 26:
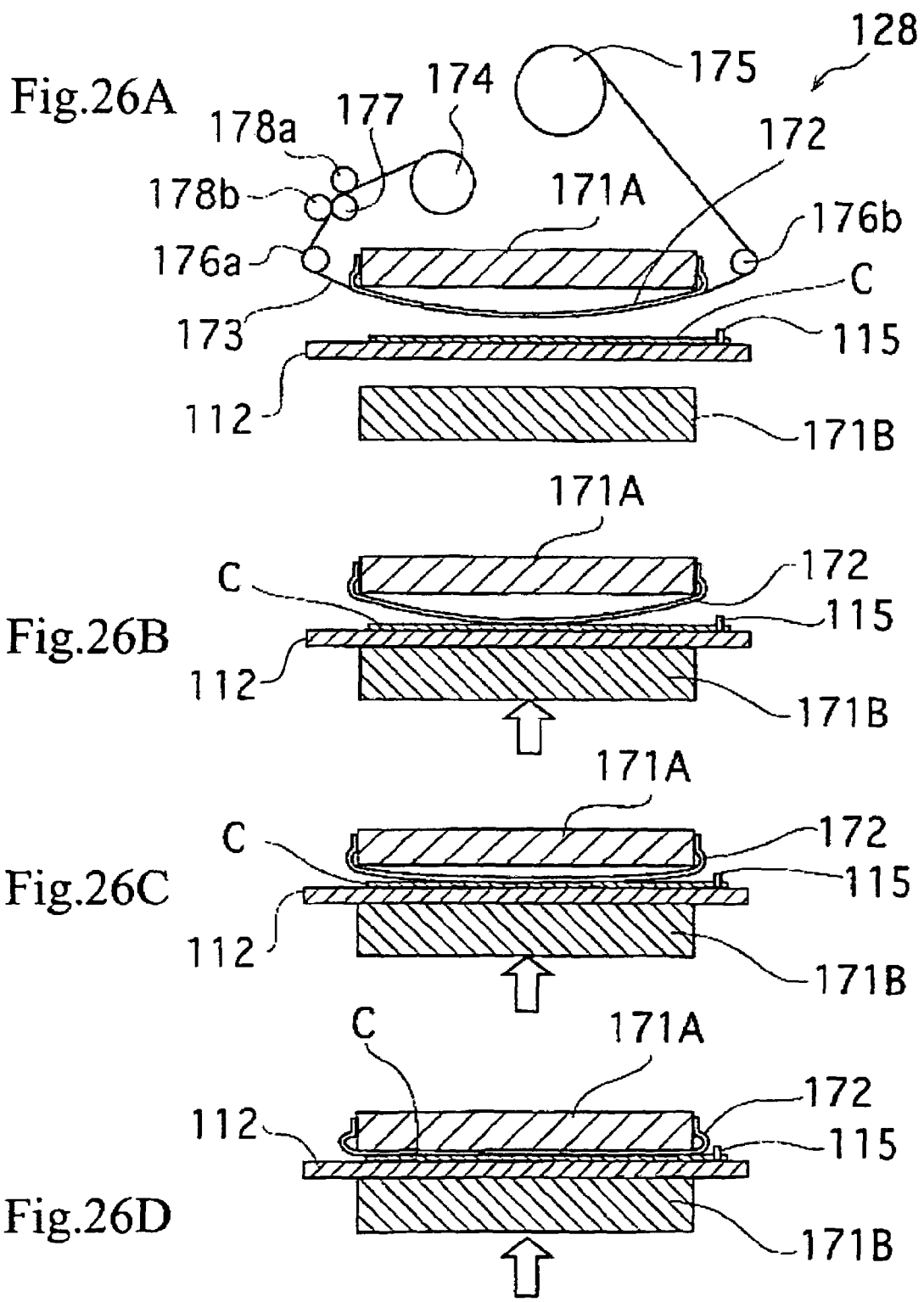
FIG. 26A to FIG. 26D are sectional views for explaining an operation of a secondary heat press portion 128.

The secondary heat press portion 128 performs heat press processing of the secondary laminate sheet C, in a state in which the upper plate member 111 is removed from the lower plate member 112. FIG. 26A is a side sectional view showing schematically a construction of the secondary heat press portion 128.

The secondary heat press portion 128 uses, in place of the upper plate member 111, a curved press plate 172 attached so as to cover the lower surface of a heated platen 171A on the upper side, as shown in FIG. 26A.

The curved press plate 172 is obtained by curving, for example, a stainless steel plate having a thickness of about 1 mm, and both ends thereof are secured to both sides of the heated platen 171A. During heat press, if a heated platen 171B on the lower side elevates, the curved press plate 172, due to the contact with the secondary laminate sheets C on the lower plate member 112, elastically deforms as shown stepwise in FIG. 26B to FIG. 26D, and then presses the secondary laminate sheets C by the flattened press surface thereof.

A resin film 173 is interposed between the curved press plate 172 and the secondary laminate sheets C.

The resin film 173 is fed from an unwinding roller 174 and rolled up by a winding roller 175 through a guide roller 176a, the lower surface of the curved press plate 172 and a guide roller 176b. A feed roller 177 for feeding the resin film 173 to the lower surface of the curved press plate 172 is disposed between the unwinding roller 174 and the guide roller 176a. Two adhesive rollers 178a and 178b are arranged so as to contact the feed roller 177. The adhesive rollers 178a and 178b are provided with the purpose of eliminating dust attached to the surface of the resin film 173 on the side opposed to the secondary laminate sheets C.

The resin film 173 is formed by a synthetic resin material softer than the secondary laminate sheets C, and is used with the purposes of manufacturing a sheet layer body having excellent surface finish by, for example, improving the luster of the sheet surface after being subjected to the secondary heat press, and, if foreign articles such as waste exists on the sheet surface, by having the foreign articles embedded into the resin film 173 side in order to suppress the occurrence of dents in the sheet surface.

As the resin film 173, for example, stretch polypropylene (OPP) film, stretch polyethylene terephthalate (OPET) film and the like are applicable.

Referring to FIG. 25, the secondary cooling press portion 129 has the same construction as the first and second cooling press portions 125 and 126 in the primary laminate section. To the secondary cooling press portion 129, there is supplied in a state in which the upper plate member 111 is overlaid on the lower plate member 112. That is, after the termination of the press processing in the secondary heat press portion 128, the lower plate member 112 returns to the secondary laminate sheet supply portion 127 on an upstream side. There at, the lower plate member 112 is overlaid on the upper plate member 111, which has been held by the plate holding unit 134B. Thereafter, the inside is subjected to vacuum pumping through the nozzle operating cylinder 107B, and then transferred through the secondary heat press portion 128 to the secondary cooling press portion 129.

<Sheet Extraction Section>

The layered sheets C2 manufactured through the secondary laminate processing are taken off to the exterior of the apparatus by a sheet extraction section 130. The sheet extraction section 130 is disposed on the rear end of the transfer rail 102A on an upper stage side in the second embodiment.

The sheet extraction section 130 is, as shown in FIG. 25, provided with a plate holding unit 134C for removing the upper plate member 111 of the carrier plate 101 from the lower plate member 112 and holding it lifted above, and a sheet transfer unit 136B for vacuum-adsorbing the layered sheets C2 on the lower plate member 112 and transferring them to a dedicated tray 182 placed in the outside of the system. The plate holding unit 134C and the sheet transfer unit 136B have the same construction of the plate holding unit 134A and the sheet transfer unit 136A, which are respectively disposed in the supply section 121.

The lower plate member 112, from which the layered sheets C2 are taken off by the sheet extraction section 130, is transferred, together with the upper plate member 111, to a rail 102C on the lower stage by an elevating unit 102B.

On the transfer rail 102C, there is disposed a plate reversing unit 185A for gripping the upper plate member 111 overlaid on the lower plate member 112, and reversing it so as to direct the pressing surface thereof.

Figure 27:
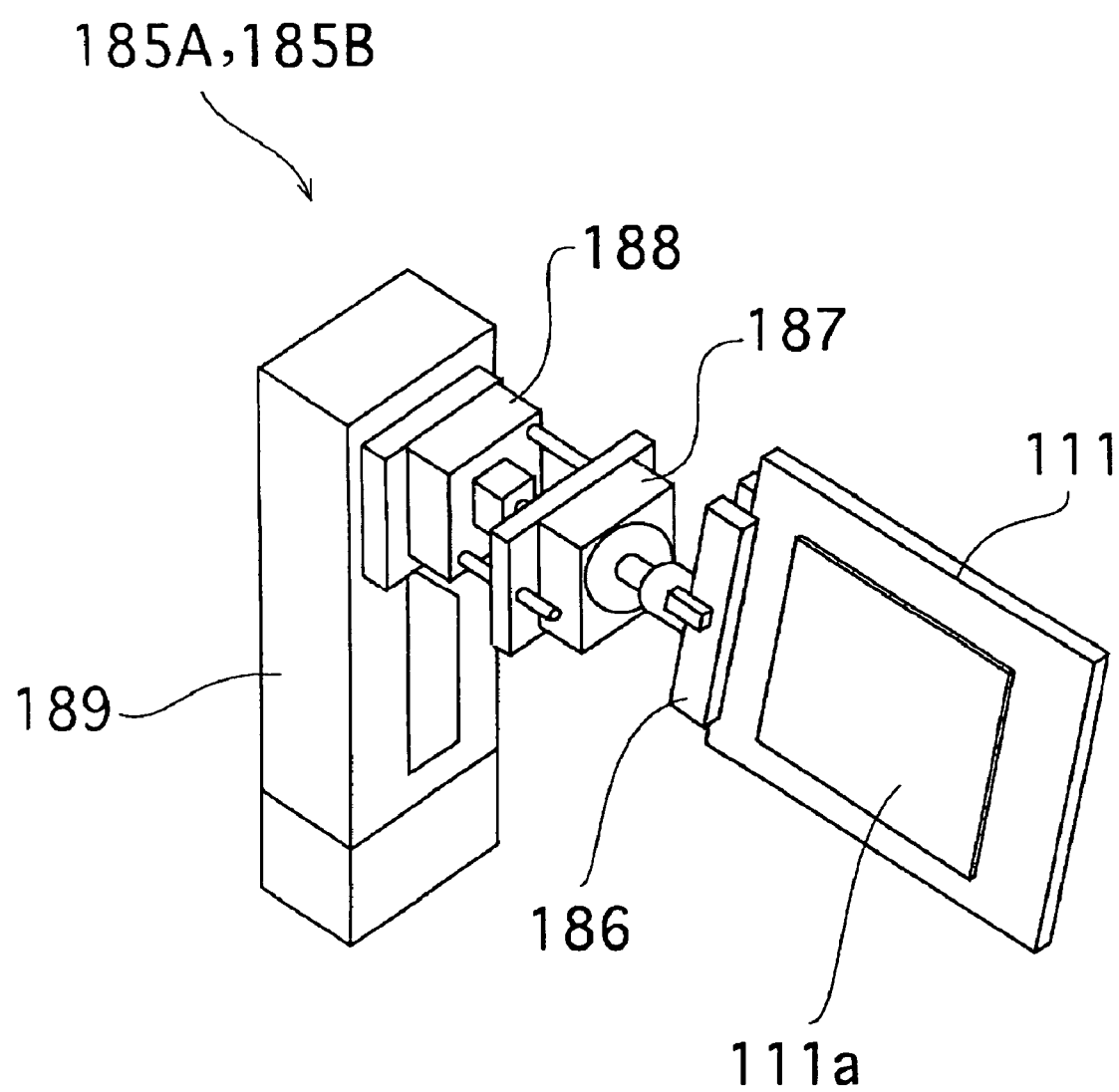
FIG. 27 is a perspective view showing a construction of a plate reversing unit 185A (185B)

The plate reversing unit 185A has, as shown in FIG. 27, a gripping portion 186 for gripping one shorter-side portion of the upper plate member 111. The gripping portion 186 is constructed so as to receive the driving force from a rotation driving unit 187 and a linear driving unit 188. The gripping portion 186 is also constructed so as to be capable of traveling up or down along a support member 189 for supporting these units.

The upper plate member 111 is constructed such that a mirror finished surface plate 111a faces upward by the plate reversing unit 185A.

<Cleaning Section>

A cleaning section 131 for cleaning the respective pressing surfaces of the upper plate member 111 and the lower plate member 112 is disposed on the transfer rail 102C. The cleaning section 131 is provided with a lapping unit 191 and a cleaning roller unit 192.

Figure 28:
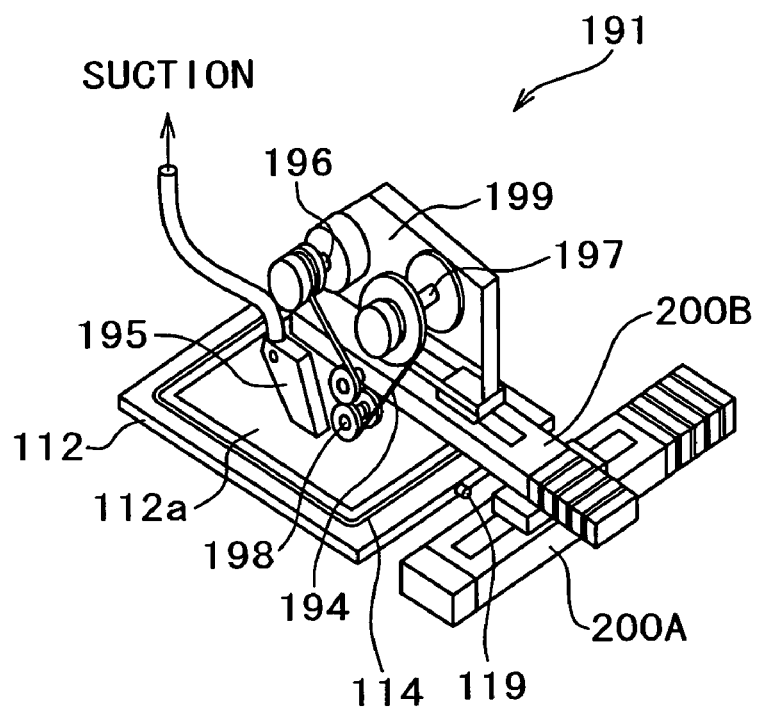
FIG. 28 is a perspective view showing a construction of a lapping unit 191 in a cleaning section.

The lapping unit 191 has, as shown in FIG. 28, a lapping tape 194 for scraping the foreign articles attached to the mirror finished surface plate 112a of the lower plate member 112 on the transfer rail 102C, and a dust eliminator 195 for sucking off and eliminating the foreign articles scraped by the lapping tape 194.

The lapping tape 194 is wound around the outer periphery of a pressure roller 198 disposed on a tape-pass passage between an unwinding axis 196 and a winding axis 197, and is pressed against the mirror finished surface plate 112a by the pressure force acting radially of the pressure roller 198. The unwinding axis 196 and the winding axis 197 are supported from a common support member 199. The support member 199 is movable in an extension direction of the transfer rail 102C and a direction orthogonal thereto, by the driving of first and second driving portions 200A and 200B, respectively.

Figure 29:
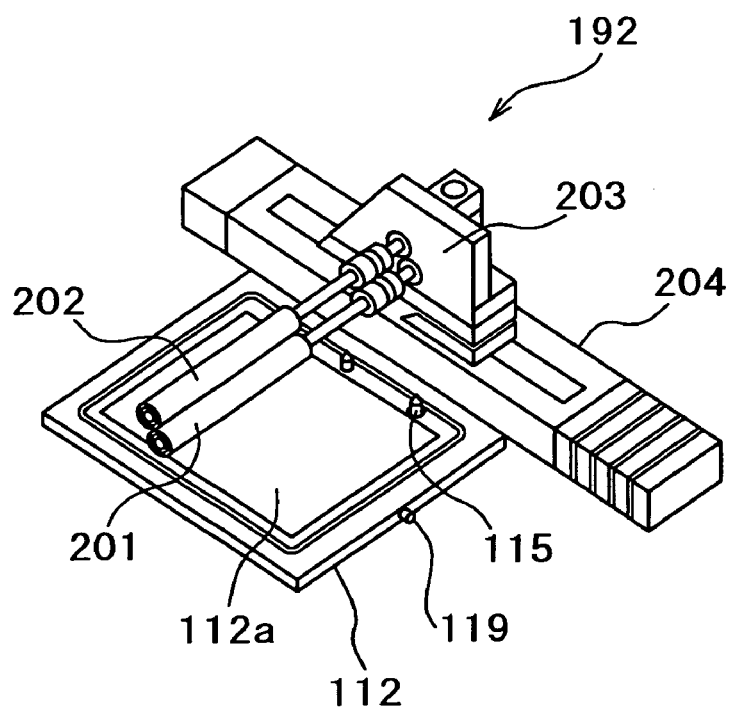
FIG. 29 is a perspective view showing a construction of a cleaning roller unit 192 in the cleaning section.

The cleaning roller unit 192 is provided with an adhesive roller 201 and an auxiliary roller 202 connected to the adhesive roller 201, as shown in FIG. 29.

The adhesive roller 201 eliminates foreign articles such as waste and resin refuse on the mirror finished surface plate 112a of the lower plate member 112. The auxiliary roller 202 eliminates the foreign articles attached to the surface of the adhesive roller 201, and cleans the adhesive roller 201. The adhesive roller 201 and the auxiliary roller 202 are respectively supported from a common support member 203, and are movable in the longitudinal direction of the lower plate member 112 by the driving of a driving portion 204.

As shown in FIG. 20, a plate reversing unit 185B for reversing the upper plate member 111 such that the pressing surface thereof faces downward is disposed on a downstream side of the lapping unit 191 and the cleaning roller unit 192. The plate reversing unit 185B has the same construction as the plate reversing unit 185A on an upstream side (FIG. 27).

The plate reversing unit 185B performs the operation of reversing the upper plate member 111 and then overlaying it on the lower plate member 112.

An operation of the card manufacturing apparatus 100 constructed as described above will next be described.

Figure 30:
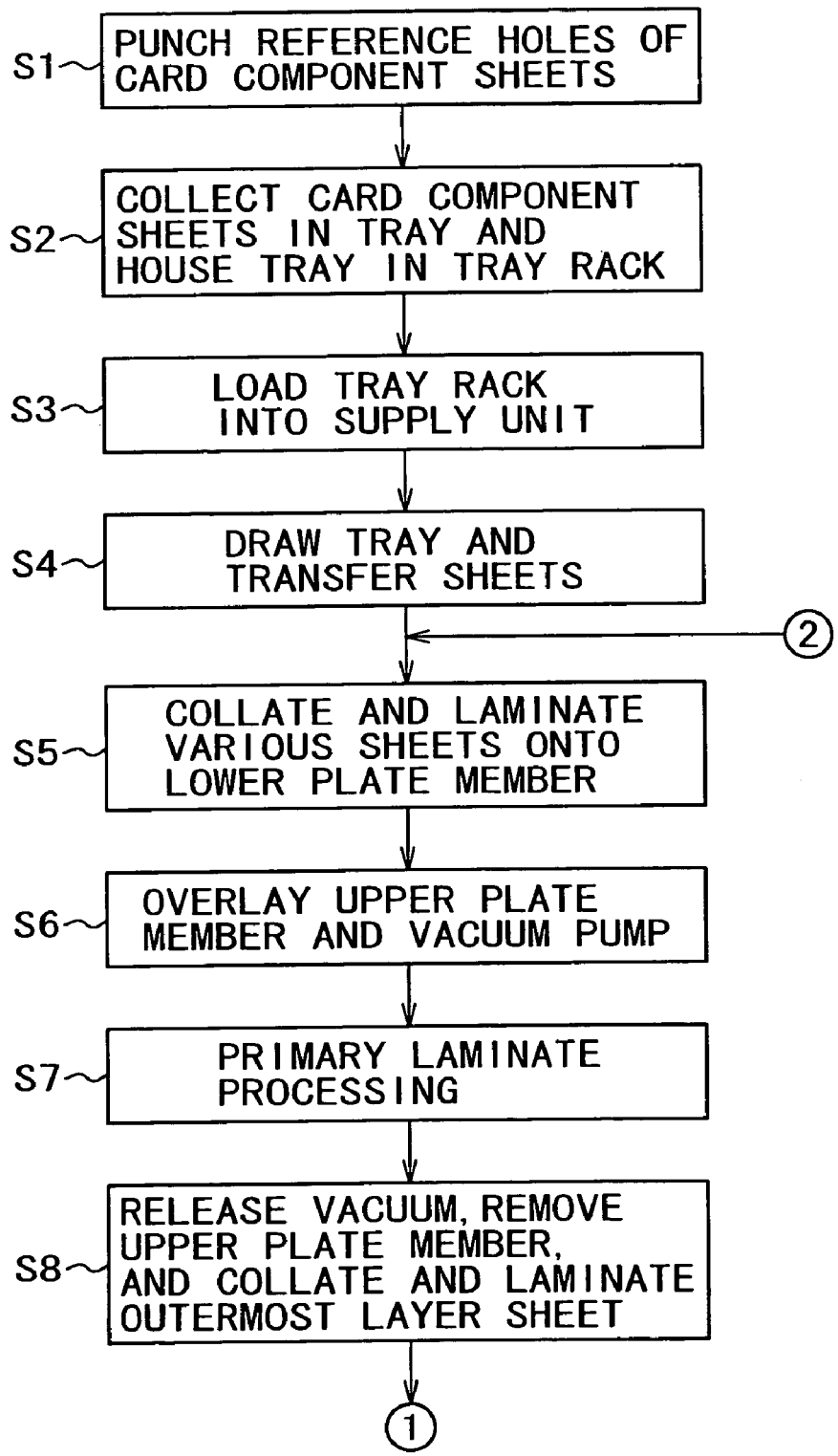
FIG. 30 is a process flow explaining an operation of the card manufacturing apparatus 100.
Figure 31:
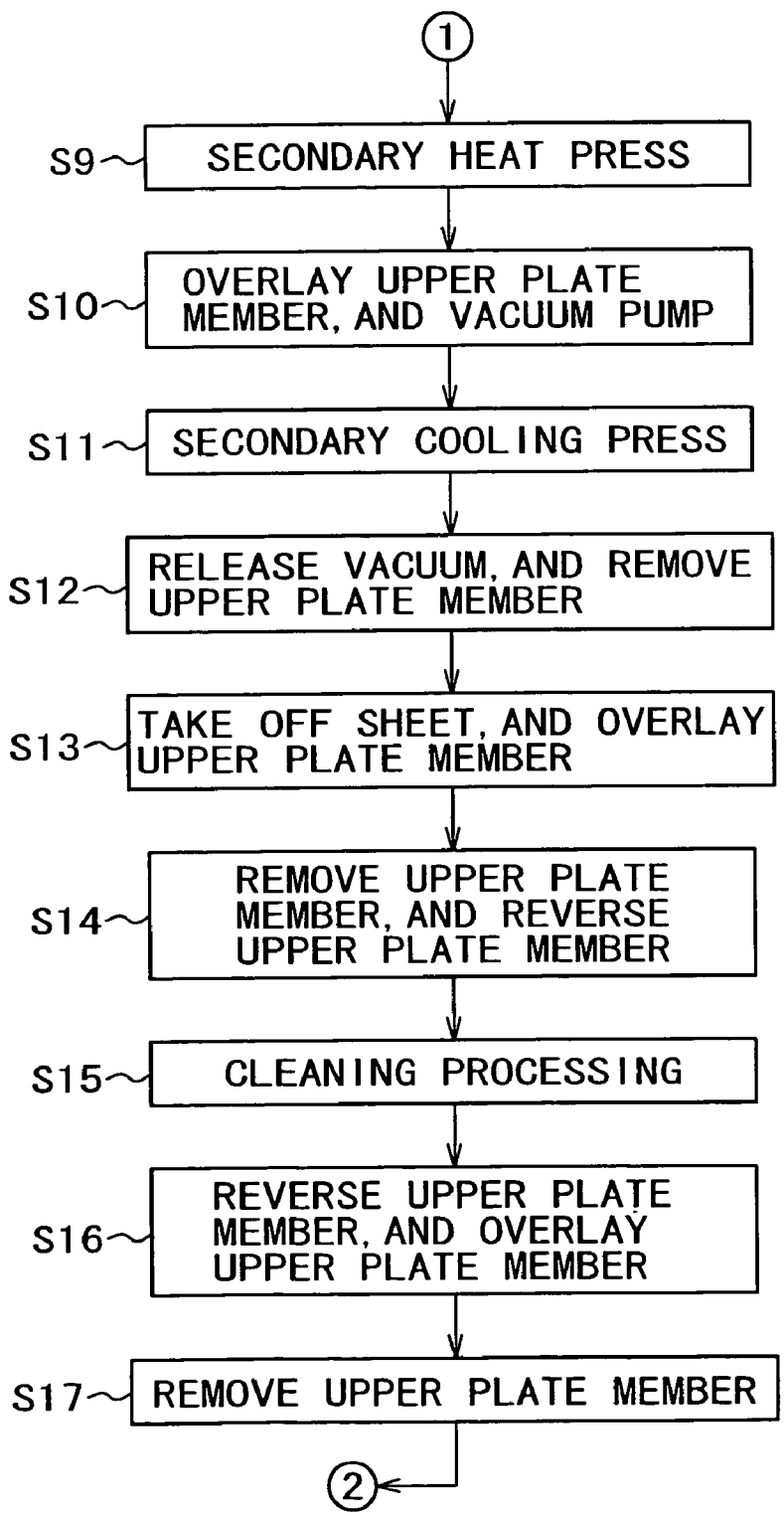
FIG. 31 is another process flow explaining an operation of the card manufacturing apparatus 100.

FIG. 30 and FIG. 31 are a process flow explaining an operation of the second embodiment.

<Card Component Sheet Preparatory Step>

As shown in FIG. 22, first, reference holes 116a to 116c for collation are formed in card component sheets C by the punching unit 145 (step S1).

In the second embodiment, as described with reference to FIG. 17, the reference hole 116a at the center is taken as a round hole having substantially the same shape as the positioning pin 115 of the lower plate member 112, and the reference holes 116b and 116c on both sides are taken as an ellipse hole having an opening area larger than the sectional area of the positioning pin 115.

The punching of the reference holes 116a to 116c may be performed sheet by sheet, or performed at a time by stacking a plurality of sheets together.

Subsequently, the card component sheets C, in which the reference holes 116a to 116c are formed, are stored according to type in their dedicated trays 139, and the trays 139 are housed in the tray rack 138 in order of layering of cards (step S2).

In the second embodiment, the plastic cards to be manufactured have a seven-layer structure, and therefore seven types of card component sheets C are used. The housing direction of the trays 139 relative to the tray rack 138 is a direction in which the reference holes 116a to 116c of the card component sheets C to be stored in the trays 139 are faced near side.

Subsequently, a step of charging the tray rack 139 into a supply unit 140 of the card manufacturing apparatus 100 is performed (step S3).

In this step, as shown in FIG. 20, the carriage 146 on which the tray rack 138 is mounted is positioned and secured by fitting the guide rods 147A and 147B thereof in the guide holes 149A and 149B on the apparatus 100 side. Thereafter the tray rack 138 is charged in the inside of the supply unit 140. The tray rack 138 charged in the supply unit 140 is moved to the uppermost position by the elevator 141.

<Sheet Supply Step>

Then, the trays 139 are sequentially took off from the tray rack 138 to the guide rail portion 142, and there is performed a step of transferring the card component sheets C by the sheet transfer unit 136A, toward the lower plate member 112 positioned and held in standby at the starting end of the transfer rail 102A (step S4).

The guiding of the trays 139 is performed in order of layering of the sheets. In the second embodiment, this is done in bottom-to-top order from the lowermost stage of the tray rack 138. The tray 139 so took off is then guided to the sheet pickup portion 137, at which one of the card component sheets C is adsorbed by the sheet transfer unit 136A located above, and transferred to the lower plate member 112.

The card component sheets C adsorbed and held by the sheet transfer unit 136A are transferred to the lower plate member 112 positioned and held in standby by the supply section 121 (the starting end of the transfer rail 102A), so that a total of seven types of card component sheets C are layered on the pressing surface of the lower plate member 112 (step S5).

In the layering of the card component sheets C to the lower plate member 112, all the sheets C can be layered at high collation accuracy by having the three positioning pins 115 disposed vertically in the lower plate member 112 pass through the respective reference holes 116a to 116c of the card component sheets C, respectively.

In accordance with the second embodiment, the ellipse holes of the reference holes 116b and 116c have play relative to the positioning pin 115. Therefore, even if there is a slight dislocation in the ellipse hole forming position in the individual card component sheets C, this dislocation can be adsorbed by virtue of the above-mentioned play, thereby permitting layering without causing distortion in the individual sheets C.

<Primary Laminate Step>

Next, the upper plate member 111 held by the plate holding unit 134A is overlaid on the lower plate member 112, followed by the vacuum pumping of the sheet holding portion 113 in the inside of the carrier plate 101 (step S6).

The vacuum pumping of the sheet holding portion 113 is performed by a degassing unit such as a vacuum pump (not shown), through the nozzle operating cylinder 107A connected to the check valve apparatus 119 (FIG. 21).

At this time, as shown in FIG. 18B, the base portion 114a of the sealing member 114 is attached in close contact to the lower plate member 112 (the circular groove 112C), and the sealing portion 114b is also attached in close contact to the internal surface of the upper plate member 111, so that the sheet storing section 113 is depressurized to a predetermined pressure. Along with an increase in vacuum pressure, the space between the two plate members 111 and 112 decreases, and the sealing portion 114b of the sealing member 114 causes a larger amount of deformation to the lower plate member 112 side. The elastic force at this time is converted to the adhesion force of the sealing portion 114b, thereby obtaining the sealing property of the sheet storing section 113. In addition, atmospheric pressure acts on the lower surface side of the sealing portion 114b, which also helps to improve the sealing action of the sealing portion 114b.

The sealing member 114 of the second embodiment can prevent the positional drift of the sealing member 114 during the vacuum pumping and the press processing, by slip-off preventing structure between the base portion 114a and the circular groove 112c.

Further, the sealing portion 114b attached in close contact to the lower plate member 111 has a thin shape, and is formed on the outer peripheral side relative to the base portion 114a. Therefore, it is easier to cause elastic deformation than conventional seal rings having a circular or square cross section. It is therefore able to reduce the exhaust time of the sheet storing section 113.

Although a conventional seal ring having circular or square cross section is of a structure to receive compressive deformation in the entire cross section thereof, the sealing member 114 of the second embodiment is of a construction such that the connecting portion 114c making connection between the base portion 114 and the sealing portion 114b mainly receives deformation load. Therefore, "fatigue" due to the repeated deformation of the sealing member 114 can be reduced, thereby permitting more rapid improvement in durability than the conventional seal rings.

Additionally, since the non-return function of the check valve apparatus 119 inhibits the outside air from entering the sheet storing section 113, a predetermined vacuum pressure in the sheet storing section 113 is maintained. Hence, the state of being connected to the vacuum pump can be discontinued during the transfer of the carrier plate 101.

Further, since the exhaust passage 118 is formed in the inside of the lower plate member 112, it is able to miniaturize the carrier plate 101 and improve portability thereof, and it is also able to obtain a compact construction such that the check valve apparatus 119 is attached to the side surface of the lower plate member 112.

Subsequently, the primary laminate processing of the card component sheets C in the inside of the carrier plate 101 is performed by sequentially transferring the carrier plate 101 to the first preheat press portion 122, the second preheat press portion 123, the heat press portion 124, the first cooling press portion 125 and the second cooling press portion 126 (step S7).

In the respective press portions, the carrier plate 101 is positioned and stopped on the transfer rail 102A, and lifted from the transfer rail 102A by the heated platen 151B or the cooled platen 161B on the movable support plate 153 elevated by the driving of the press driving portion 155, and then pressed against the heated platen 151A or the cooled platen 161B located above (FIG. 2, FIG. 24). Thereby, the carrier plate 101 can be pressed by a pair of the heated platens 151A and 151B or a pair of the cooled platens 161A and 161B, so that the card component sheets C in the inside thereof are subjected to press processing.

In accordance with the second embodiment, since the card component sheets C layered in the inside of the carrier plate 101 are positioned by the positioning pins 115, respectively, the positional drift of the card component sheets C during the press steps can be avoided.

Further, since the reference holes passing through the positioning pins 115 consists of a single reference hole 116a having a round hole shape and two reference holes 116a and 116c having an ellipse hole shape, it is able to prevent the distortion and twisting of the card component sheets C due to the lateral dislocation during the press processing, thereby executing appropriate press processing.

Additionally, in the second embodiment the preheat press portions 122 and 123, the heat press portion 124 and the cooling press portions 125 and 126, each constituting the primary laminate section, are respectively arranged in series. Therefore, the preheat press processing and the cooling press processing can be performed in multistage while reducing the area of installation, thereby facilitating the additions of press portions. This enables to implement a variety of press processing according to the combination of the construction materials of the card component sheets C.

Furthermore, since in the second embodiment the press driving portion 155 is disposed on the side of the lower heated platen 151B or the cooled platen 161B, the dust generated from the press driving portion 155 side exerts no influence on press processing.

<Secondary Laminate Step>

Next, the carrier plate 101, with which the primary laminate processing is completed, is transferred to the secondary laminate sheet supply section 127. Thereafter, the vacuum in the inside of the carrier plate 101 is released, and the upper plate member 111 is removed by the plate holding unit 134B (step S8, FIG. 27).

The operation of releasing the vacuum in the inside of the carrier plate 101 is effected by connecting the nozzle operating cylinder 107B disposed in the vicinity of the transfer rail 102A to the check valve apparatus 119, and mechanically opening the check valve so as to introduce air into the sheet storing section 113.

The layer sheets C1 manufactured through the foregoing steps may, as it is, become a complete article as a product. Alternatively, as a secondary laminate sheet, magnetic stripes, a magnetic stripe shielding sheet, an outermost layer printing sheet and the like are further collated and layered on the surface of the layer sheets C1. Thereafter, the respective plate members 111 and 112 are stacked together again, and then supplied to the secondary laminate section, which is a later stage, thereby obtaining layered sheets C2. In the second embodiment the latter case is employed, and its description is given below.

The collation and layering of secondary laminate sheets C to the layer sheets C1 is performed by having the positioning pins 115 of the lower plate member 112 pass through the reference holes formed in the secondary laminate sheets C by using a sheet transfer unit (not shown) (step S8).

The lower plate member 112, on which the secondary laminate sheets C are layered, are transferred, without being covered with the upper plate member 111, to a secondary heat press portion 128, followed by a secondary heat press processing (step S9).

In the secondary heat press portion 128, as schematically shown in FIG. 26A, there is performed heat press processing via a resin-made film 173, which is executed by the curved press plate 172, to the secondary laminate sheets C on the lower plate member 112. The secondary laminate sheets C on the lower plate member 112 abut the curved press plate 172 by the ascending motion of the heated platen 171B. By a further ascending of the heated platen 171B, the curved press plate 172 presses the secondary laminate sheets C, while elastically deforming as shown in FIG. 26B to FIG. 26D.

In the secondary heat press processing, the secondary laminate sheets C are pressed via the resin-made film 173 softer than the secondary laminate sheets C. As a result, the foreign articles such as waste attached to the surface of the secondary laminate sheets C embed into the resin-made film 173 side during the press, thereby avoiding the occurrence of dents or pressure-dents to the surface of the secondary laminate sheets C. In addition, since a smooth surface of the resin-made film 173 is transferred to the surface of the secondary laminate sheets C, luster can be applied to the sheet surface, and the surface quality can be improved.

On the other hand, as shown in FIG. 26B to FIG. 26D, the curved press plate 172 gradually deforms during the press processing, from the center of the secondary laminate sheets C to the outer peripheral side, so that it finally presses approximately the entire region of the sheets. This functions to release the air existing between the surface of the secondary laminate sheets C and the resin-made film 173 from the center of the surface of the sheets to the outer peripheral side. This enables to weld the secondary laminate sheets C onto the surface of the layer sheets C1, without causing bubbles and the like.

Referring to FIG. 25, after the termination of the secondary heat press processing, the lower plate member 112 returns to the secondary laminate sheet supply section 127.

Then, the upper plate member 111, which has been held by the plate holding unit 134B, is overlaid on the lower plate member 112. Thereafter, by the action of the nozzle operating cylinder 107B, the sheet storing portion 113 in the inside of the carrier plate 101 is subjected to vacuum pumping via the check valve apparatus 119 (step S10).

After the inside of the carrier plate 101 is subjected to vacuum pumping up to a predetermined pressure, the carrier plate 101 is transferred through the secondary heat press portion 128 to the secondary cooling press portion 129, at which the secondary cooling press processing is performed (step S11).

After the secondary cooling press processing is terminated, the carrier plate 101 is transferred to the sheet extraction section 130. There at, in the carrier plate 101, the vacuum state of the inside of the carrier plate 101 is released by the operation of the nozzle operating cylinder 107C, and then the upper plate member 111 is removed by the plate holding unit 134C (step S12).

In the sheet extraction section 130, the layered sheets C2, from which the upper plate member 111 is removed, and with which the secondary laminate is completed, are transferred through the sheet transfer unit 136B onto the dedicated tray 182 in the outside. The layered sheets C2 within the dedicated tray 182 are punched in the size of a single card by, for example, the card punching unit 40 described with reference to FIG. 14, thereby completing plastic cards.

After the layered sheets C2 are taken off, the upper plate member 111 is overlaid on the lower plate member 112 (step S13). The upper plate member 111 and the lower plate member 112, in a state of being overlapped with each other, are transferred via the elevating unit 102B to the transfer rail 102C on the lower stage side. They are then transferred to the cleaning section 131.

<Cleaning Step>

In the course that the carrier plate 101 is transferred to the cleaning section 131, the upper plate member 111 overlaid on the lower plate member 112 is removed by the plate reversing unit 185A shown in FIG. 27, and the mirror finished surface plate 111a is reversed 180° so as to face upward, and then mounted on the transfer rail 102C (step S14).

To the lower plate member 112 and the upper plate member 111 passed side-by-side and spaced one station apart, with the mirror finished surface plates 112a and 111a faced upward by the action of the plate reversing unit 185A, the cleaning processing of the mirror finished surface plates 112a and 111a is performed sequentially by the lapping unit 191 and the cleaning roller unit 192 (step S15).

The lapping unit 191, as shown in FIG. 28, presses the lapping tape 194 wound around the pressure roller 198 against the mirror finished surface plate 112a of the lower plate member 112, and the foreign articles such as resin scum attached to the mirror finished surface plate 112a are removed by the feed action of the first and second driving portion 200A and 200B. The dust eliminator 195 sucks the scraped foreign articles.

On the other hand, the cleaning roller unit 192, as shown in FIG. 29, sweeps foreign articles by having the adhesive roller 201 roll along the mirror finished surface plate 112a. The foreign articles attached to the roller surface of the adhesive roller 201 can be removed by the auxiliary roller 202, so that the adhesive roller 201 always has a clean surface and rolls on the mirror finished surface plate 112a.

The foregoing cleaning processing is also performed similarly to the mirror finished surface plate 111a of the upper plate member 111.

Referring to FIG. 20, the cleaned upper plate member 111 after being subjected to cleaning, which is in the course of the transfer thereof, is gripped by the plate reversing unit 185B and reversed 180° such that the mirror finished surface plate 111a faces downward, and then overlaid on the lower plate member 112 (step S16).

The carrier plate 101, on which the two plate members 111 and 112 are stacked together, is again transferred to the starting end portion of the transfer rail 102A (the supply section 121) through the elevating unit 102D. Then, the upper plate member 111 is lifted above by the plate holding unit 134A, and the next card component sheets C are layered on the lower plate member 112 (steps S17, S5).

Thus, in accordance with the second embodiment, the same effect as the above-mentioned first embodiment is obtainable.

Further, in accordance with the second embodiment, the transfer passage of the carrier plate 101 is formed by the two stages of the upper and lower transfer rails 102A and 102C. Therefore, it is able to considerably contribute to the miniaturization of the apparatus by minimizing the volume occupied by the installation of the apparatus. It is also able to dispose the supply section 121, the secondary sections (the primary and the secondary) and the sheet extraction section 130 at any position.

Third Embodiment

FIG. 32 to FIG. 36E show a third embodiment of the present invention.

In the third embodiment, the construction of a pair of upper and lower plate members forming a carrier plate as a plate for heat press is different from the above-mentioned second embodiment.

Figure 32:
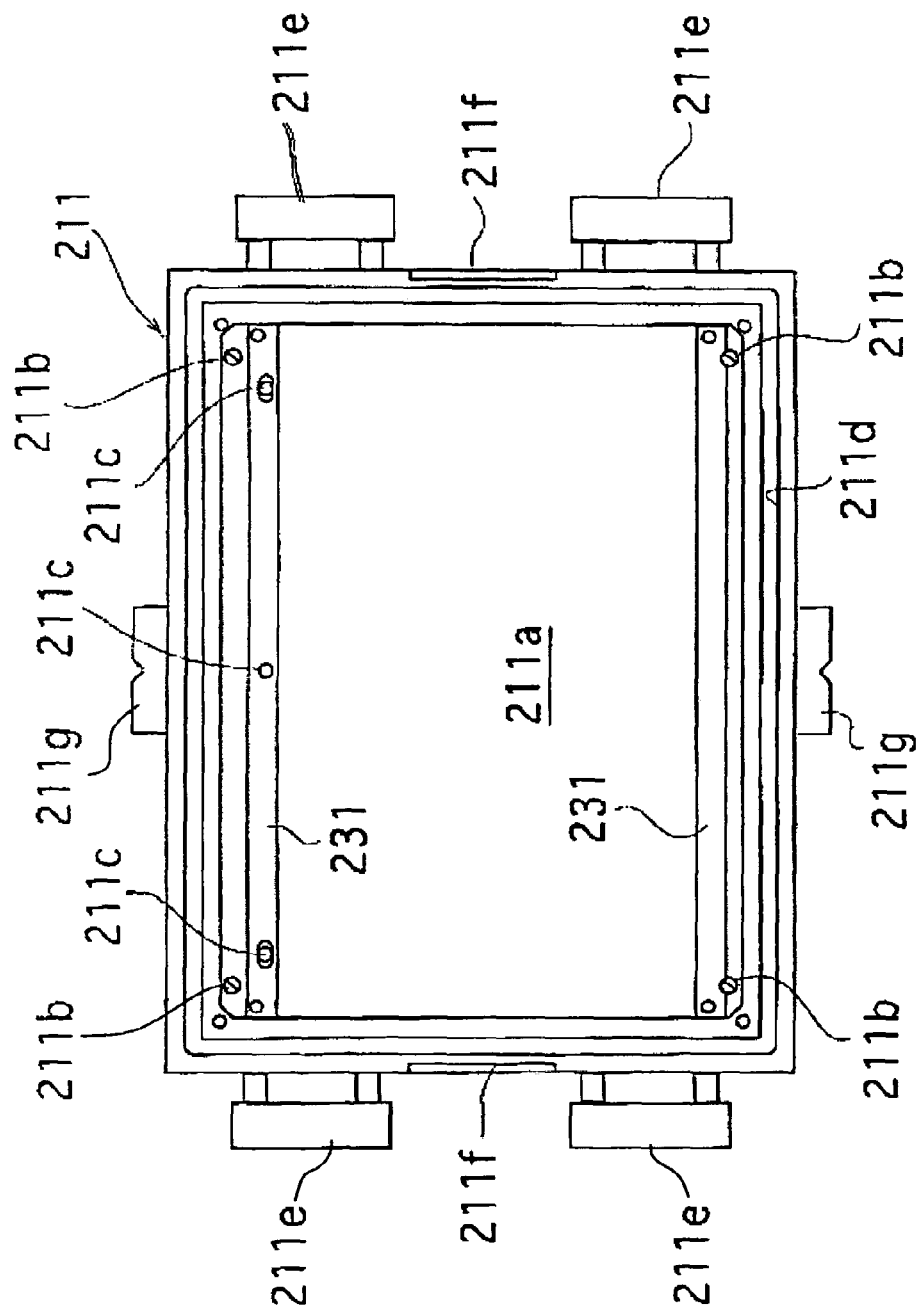
FIG. 32 is a plan view of an upper plate member 211 according to a third embodiment of the present invention, viewed from a pressing surface side.
Figure 33:
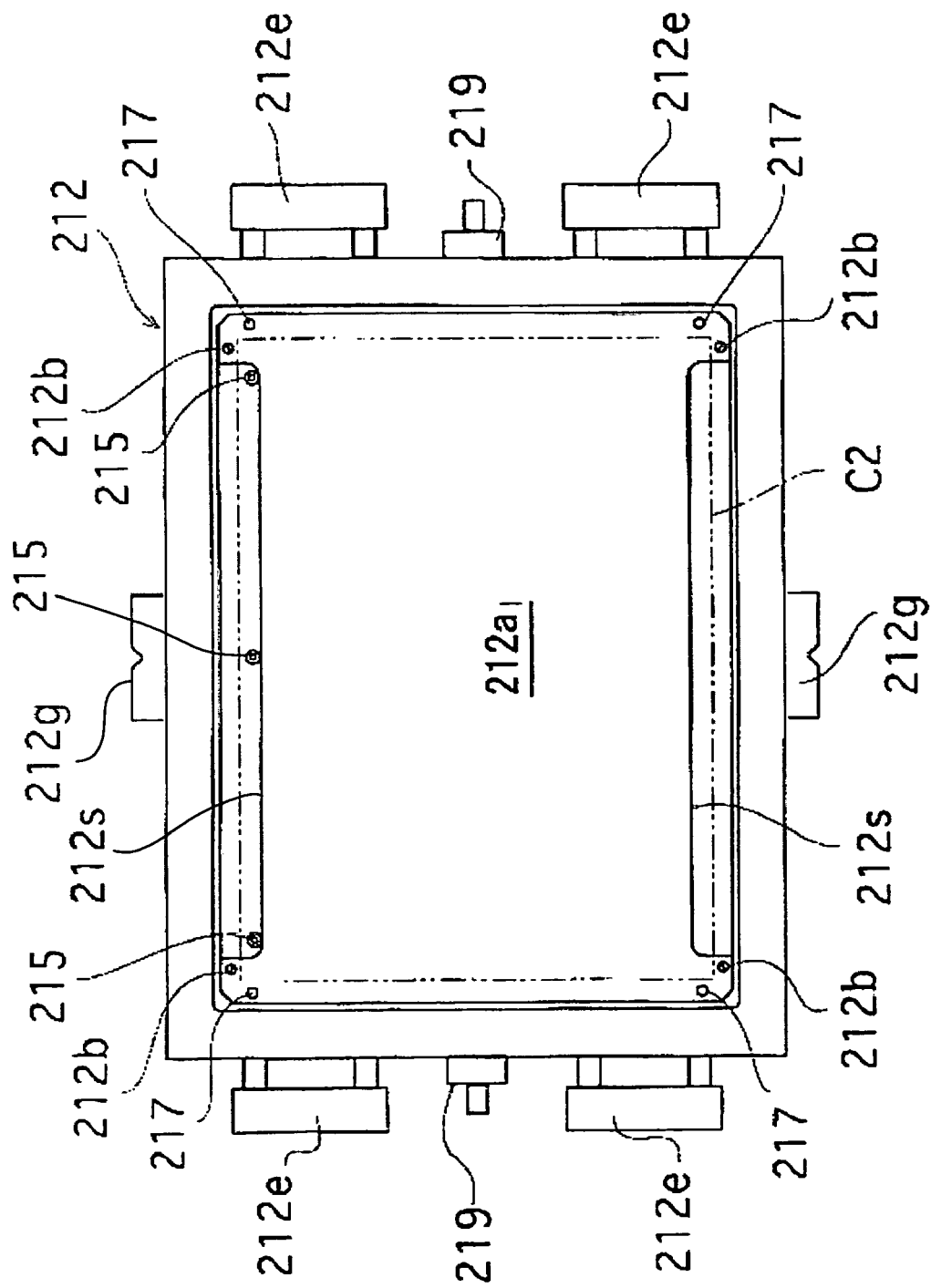
FIG. 33 is a plan view of a lower plate member 212 according to the third embodiment of the present invention, viewed from a pressing surface side.

FIG. 32 is a plan view of an upper plate member 211 in the third embodiment, viewed from its pressing surface side. FIG. 33 is a plan view of a lower plate member 212 in the third embodiment, viewed from its pressing surface side.

The upper plate member 211 is of a rectangular shape and made of a metal material such as aluminum alloy, and to the pressing surface thereof, a mirror finished surface plate 211a that is for example made of stainless steel is fixed via vises 211b.

Clearance holes 211c are formed in an in-plane region of the mirror finished surface plate 211a so as to correspond to the vertically disposing positions of the positioning pins 215 of the lower plate member 212. Additionally, a circular groove 211d for fitting a sealing member is formed in an outer position of the mirror finished surface plate 211a.

For example, a pair of the support blocks 211e supported from the transfer rail roller conveyor as described in the above-mentioned second embodiment are provided in both side surfaces on the shorter-side sides of the upper plate member 211, respectively. Recess portions 211f to receive the gripping portion of the plate reversing unit as described in the above-mentioned second embodiment are formed between a pair of the support blocks 211e.

Further, guide blocks 211g that abut a plate stopper for positioning on the above-mentioned transfer rail are provided at approximately the center on both side surfaces on the longer-side sides of the upper plate member 211, respectively.

On the other hand, the lower plate member 212 is also of a rectangular shape and made of for example aluminum alloy, and a mirror finished surface plate 212a made of such as stainless steel is fixed via vises 212b to the pressing surface thereof.

For example, a pair of the support blocks 212e supported from the transfer rail roller conveyor as described in the above-mentioned second embodiment are provided in both side surfaces on the shorter-side sides of the lower plate member 212, respectively. Check valve units 219 are provided, one each, between a pair of the support blocks 212e, and connected to degassing holes 217 via an exhaust passage formed in the inside of the plate.

Further, guide blocks 212g that abut a plate stopper for positioning on the above-mentioned transfer rail are provided at approximately the center on both side surfaces on the longer-side sides of the lower plate member 212, respectively.

In the upper plate member 211 and the lower plate member 212, a rubber sheet, a paper pad, a felt sheet or the like may be interposed, as a cushion material for adjusting thermal conductivity, between their respective plate bodies and the mirror finished surface plates 211a, 212a.

In the mirror finished surface plate 212a of the lower plate member 212, notches 212s are formed on two sides of its two longer-side sides, and three positioning pins 215 for sheet allocation are disposed vertically i n the notch 212s on one side.

Metal tapes 231 that are made of stainless steel and have a thickness of about 1 mm, for example, are disposed on the mirror finished surface plate 211a of the upper plate member 211, which correspond to the forming positions of the notches 212s.

The lower plate member 212 of the third embodiment is constructed for the purpose of improving the extraction operation of the layered sheets C2 performed by the sheet adsorbing portion 143 of the sheet transfer unit 136B, in the sheet extraction section 130 of the card manufacturing apparatus 100 described in the above-mentioned second embodiment (FIG. 25).

Specifically, the layered sheets C2 manufactured through the secondary laminate step (indicated by the chain double-dashed line in FIG. 33) attaches in close contact to the mirror finished surface plate of the lower plate member by adhesion action. As a result, the extraction of the layered sheets C2 only by the sheet adsorbing portion 143 is not easy in some cases.

Accordingly, in the lower plate member 212 of the third embodiment, the notches 212s are disposed in the mirror finished surface plate 212a, so that after the laminating processing, space is formed between the layered sheets C2 and the lower plate member 212 at the forming position of the notches 212s. In addition, as shown in FIG. 34, a plurality of adsorbing pads 221 for adsorbing the layered sheets C2 and a plurality of extraction claws 222 entering the notches 212s of the mirror finished surface plate 212a are provided on the lower surface of a main body 220 of the sheet adsorbing portion 143.

Figure 34:
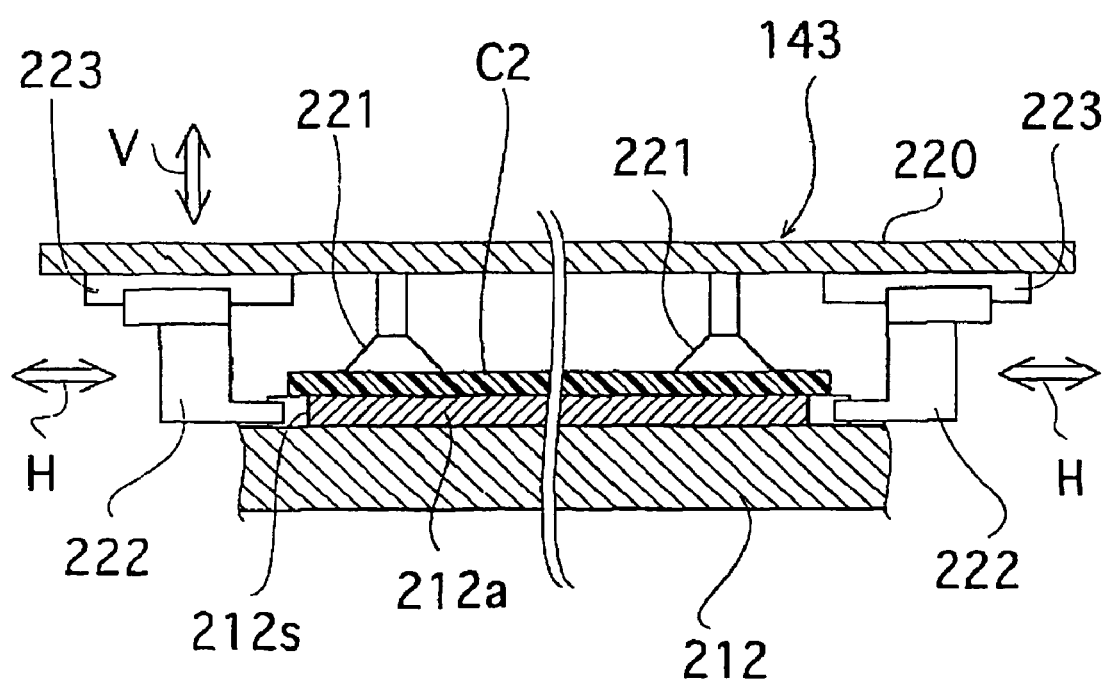
FIG. 34 is a sectional view explaining a construction of a sheet suction section 143 for taking off layered sheets C2 on the lower plate member 212 to the exterior.

The extraction claws 222 are constructed so as to be movable in the direction indicated by the arrow H in FIG. 34, along a linear guide 223 secured to the lower surface of the main body 220. Particularly, the extraction claws 222, which are disposed in the notch 212s on the side where the positioning pins 215 are disposed vertically, are preferably disposed in the vicinity of the above-mentioned positioning pins 215.

With the foregoing construction, the upper surface of the layered sheets C2 on the lower plate member 212 is adsorbed by a plurality of adsorbing pads 221 of the sheet adsorbing portion 143 shifted in a downward direction indicated by the arrow V in FIG. 34, and the extraction claws 222 enter the notches 212s that serve a run off portion, and then located between the layered sheets C2 and the lower plate member 212. Subsequently, the sheet adsorbing portion 143 moves upward, so that the extraction claws 222 lift the lower surface of the edge portions of the layered sheets C2. This enables to peel and remove the layered sheets C2 from the mirror finished surface plate 212a, thereby facilitating the extraction of the layered sheets C2 from the lower plate member 212.

Thereafter, the layered sheets C2 are adsorbed and held by the adsorbing action of the adsorbing pads 221, and then transferred to a predetermined dedicated tray 182 (FIG. 25).

Depending on the manner of arranging the extraction claws 222, the extraction of the layered sheets C2 is possible without the need for the adsorbing pads 221.

In the meantime, due to the formation of the notches 212s, the region of the layered sheets C2, which corresponds to the position immediately above the notches 212s, has not enough pressure. Therefore, there is a possibility that variations in thickness occurs by the sheet peeling due to poor welding in the above-mentioned region, and the fluidization of the sheet component material in the inside of the sheet surface.

As a means for this, in the third embodiment the metal tape 231 is attached to the pressing surface on the upper plate member 211 side as mentioned above, thereby compensating the shortage of pressure in the forming positions of the notches 212s.

Figure 36A:
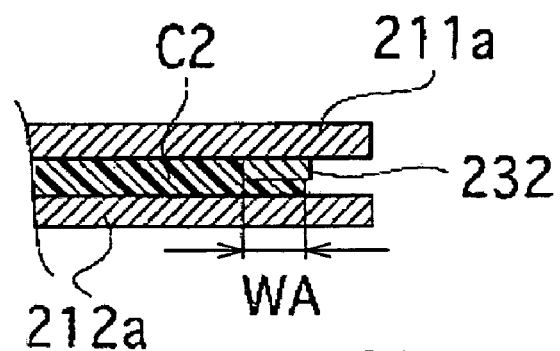
FIG. 36A to FIG. 36E are sectional views explaining an operation of a metal tape 231 and an auxiliary tape 232 attached to pressing surfaces of an upper plate member and a lower plate member.
Figure 36B:
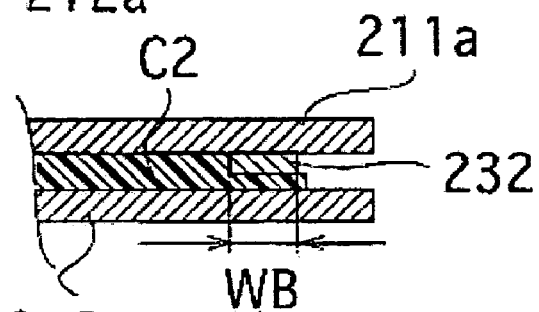
Figure 36C:
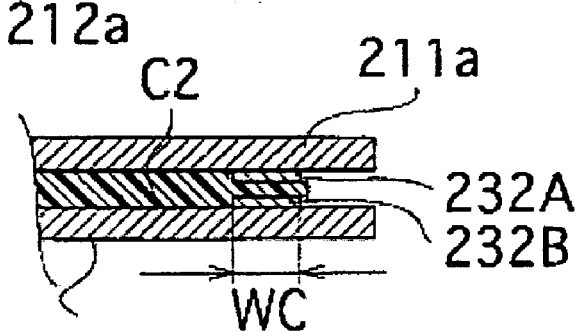
Figure 36D:
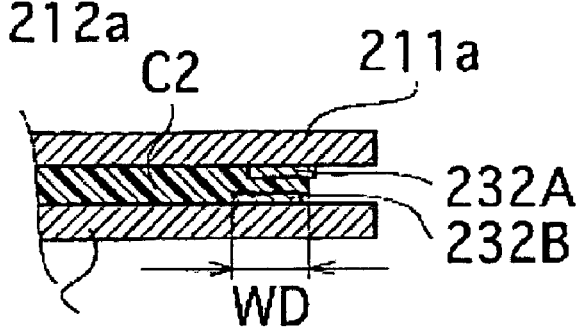
Figure 36E:
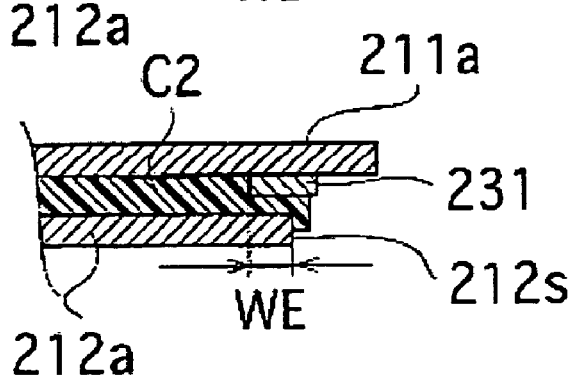

That is, as shown in FIG. 36E, in the region of the layered sheets C2 located immediately above the notches 212s, the pressure is increased by the amount corresponding to the thickness of the metal tape 231 attached to the mirror finished surface plate 211a of the upper plate member, thereby realizing accurate welding. In addition, the fluidization of the sheet component material can also be suppressed, thereby suppressing variations in thickness in the inside of the sheet surface.

The adjustment of pressure by the metal tape 231 is also executable, without limiting to the thickness of the auxiliary tape 232, by the attaching position of the metal tape 231, namely, by the adjustment of pressure intensifying width WE by the metal tape 231, as shown in FIG. 36E.

In the case where the attachment of the metal tape 231 only to the longer-side regions in the outer periphery of the mirror finished surface plate 211a causes a significant shortage of pressure of the layered sheets C2 in the longer-side regions in the outer periphery of the mirror finished surface plate 211a, it is capable of cope with this case by attaching a similar metal tape to the above-mentioned shorter-side regions.

Figure 35:
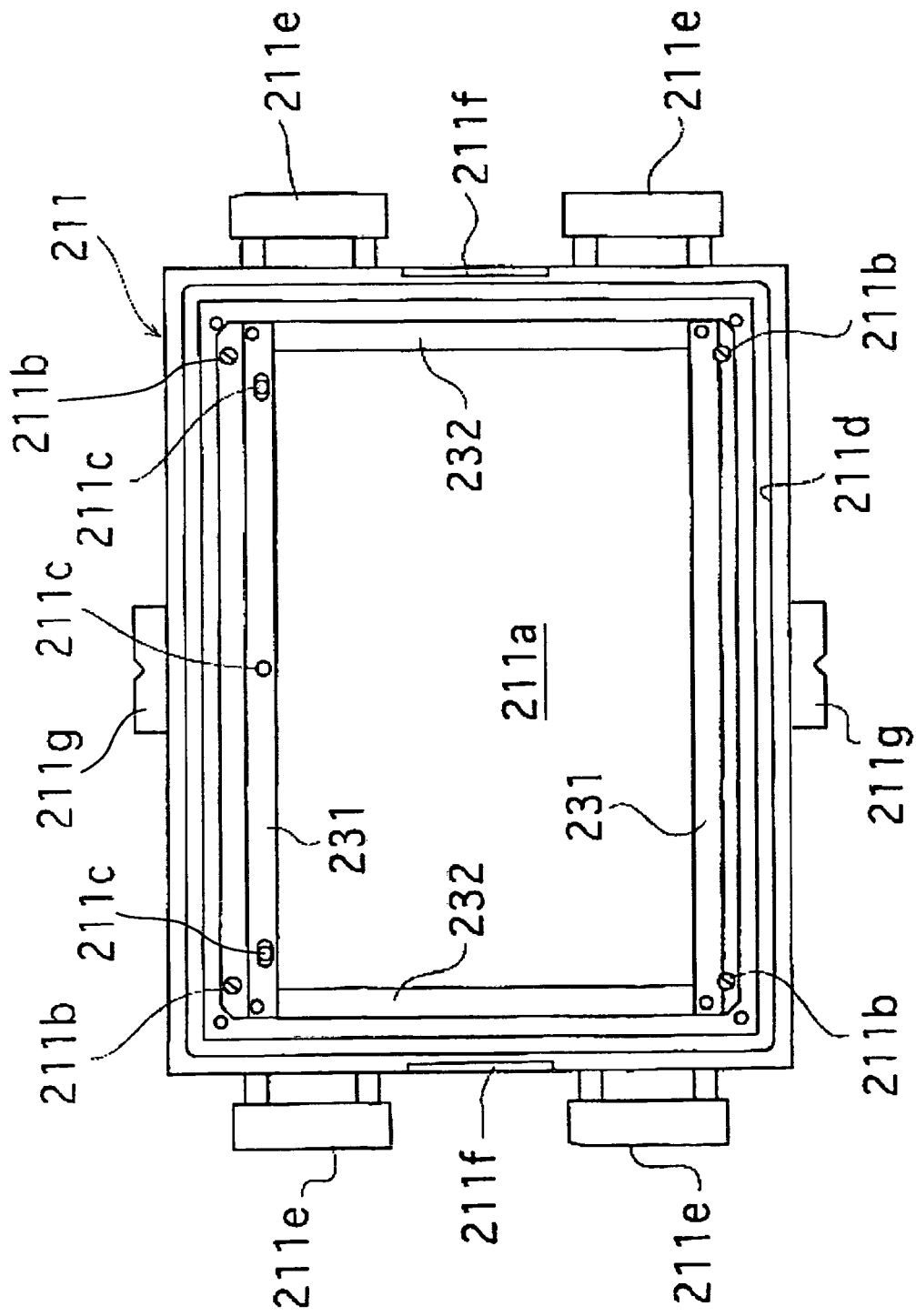
FIG. 35 is a plan view showing a modification of the construction of a pressing surface of the upper plate member 211.

FIG. 35 shows an example of attaching auxiliary tapes 232 similar to the metal tape 231 to the shorter-side regions of the mirror finished surface plate 211a of the upper plate member 211.

The auxiliary tapes 232 are for example made of stainless steel and formed so as to be thinner than the metal tape 231. The auxiliary tapes 232 are attached so as to connect the individual ends of the two metal tapes 231 in the shorter-side regions in the periphery of the mirror finished surface plate 211a.

FIG. 36A and FIG. 36B are sectional views of the important parts showing an action of the auxiliary tapes 232 with respect to the layered sheets C2. The auxiliary tapes 232 perform an action of pressure intensifying to the edge portions of the shorter-sides of the sheets. This enables to eliminate the shortage of pressure on the shorter-side sides, thereby optimizing the secondary step.

FIG. 36B shows an example in which the auxiliary tapes 232 are attached to the plane of the sheets at a position more inwardly than the example shown in FIG. 36A. Thereby, it is able to obtain a larger pressure intensifying width WB than the pressure intensifying width WA of the auxiliary tapes 232 shown in FIG. 36A.

Note that the application of the auxiliary tapes 232 is not limited to a constructive example of attaching them on the mirror finished surface plate 211a side of the upper plate member. For example, as shown in FIG. 36C and 36D, auxiliary tapes 232A and 232B may be attached to both of the mirror finished surface plate 211a of the upper plate member and the mirror finished surface plate 212a of the lower plate member so as to be opposed to each other. Even in this case, the auxiliary tapes 232A and 232B cooperate to effect pressure intensification in the shorter-side regions of the sheets.

Here, as shown in FIG. 36D, if the auxiliary tape 232A and the auxiliary tape 232B are attached so as not to be aligned, it is able to obtain a larger pressure intensifying width WD than the pressure intensifying width WC as in the case shown in FIG. 36C.

Although there has been described certain embodiments of the present invention, the present invention is of course not limited to these embodiments, and various modifications may be made based on the technical idea of the present invention.

For example, although in the above-mentioned second embodiment, the exhaust passage 118 and the check valve apparatus 119 are disposed on the lower plate member 112 side relative to the carrier plate 101, without limiting to this, they may be disposed on the upper plate member 111 side.

Although in the above-mentioned first and second embodiments, there has been described the process of manufacturing the IC cards as a plastic card, without limited to this, the present invention is also applicable to the manufacturing process of other card-like storage media such as magnetic cards.

Figure 37A:
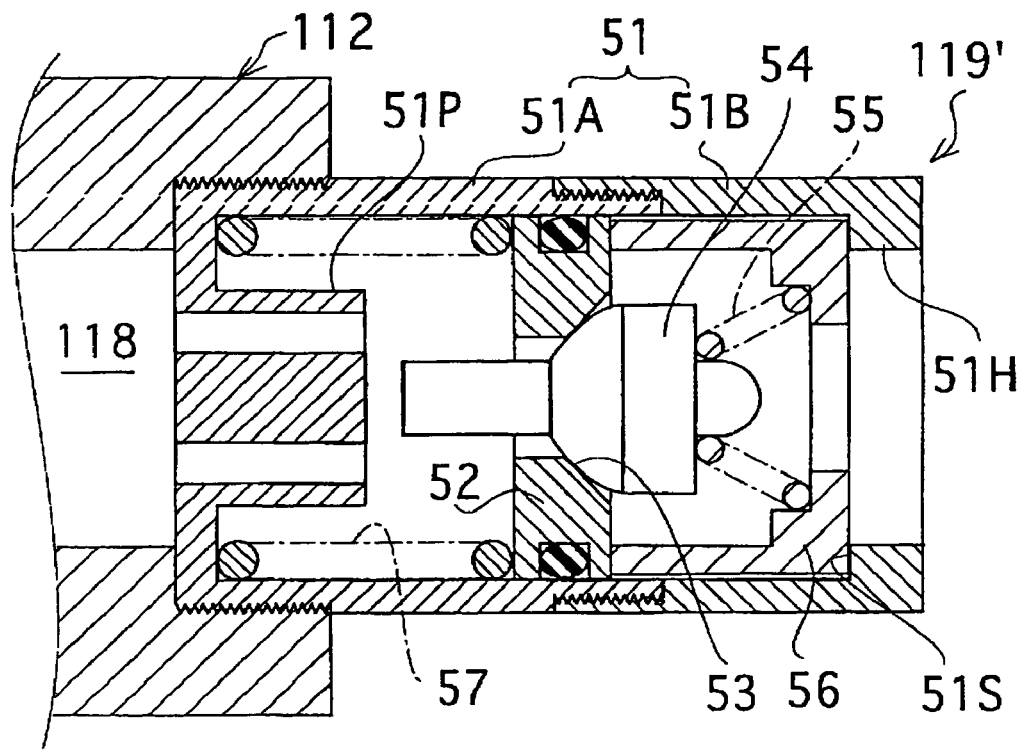
FIG. 37A and FIG. 37B are sectional views showing an example of the construction of a check valve apparatus 119.
Figure 37B:
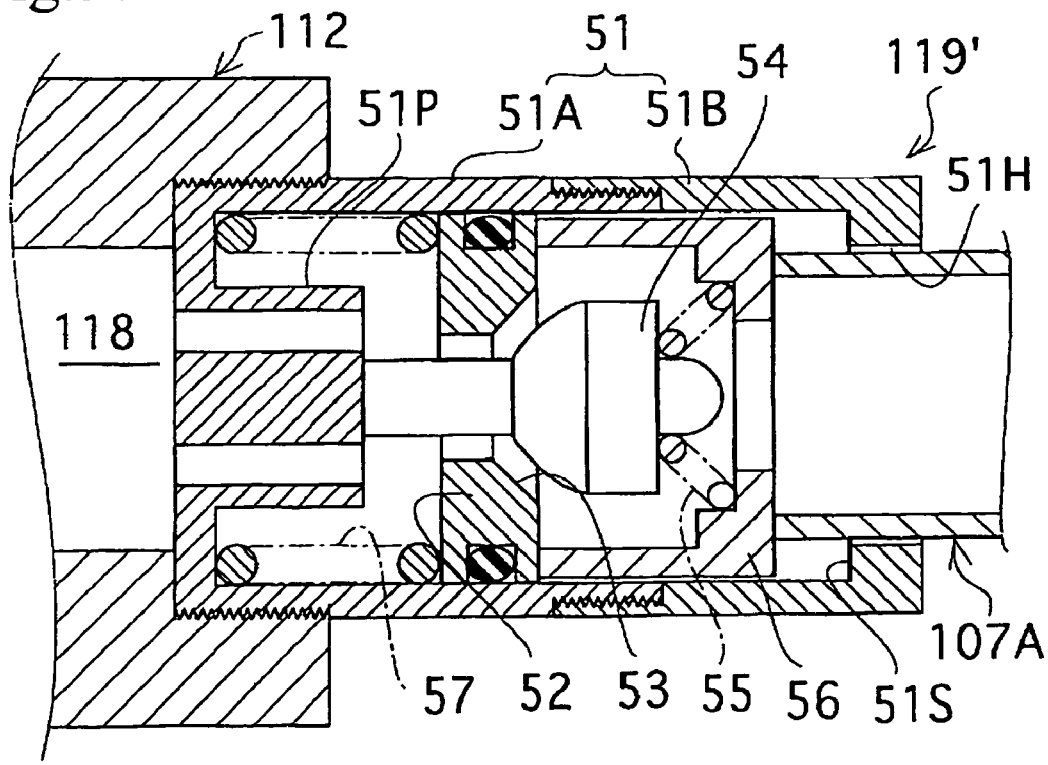

As the check valve apparatus 119, it is capable of employing one having the construction schematically shown in FIG. 37A or FIG. 37B.

A check valve apparatus 119' shown in FIG. 37A or 37B comprises a casing 51 consisting of a member 51a and a member 51B pneumatically jointed with screw-engagement, a movable member 52 pneumatically sliding relative to the internal wall surface of the casing 51, a valve seat formed in the movable member 52, a valve member 54 that can be set to and removed from the valve seat 53, a valve spring 55 for energizing the valve member 54 toward the valve seat 53, a retainer 56 for supporting one end of the valve spring 55, and a spring member 57 for energizing the movable member 52 to the retainer 56 side. The check valve apparatus 119' so constructed is pneumatically joint with screw-engagement to the lower plate member 112.

The nozzle operating cylinder 107A is connected via an opening 51H of the casing 51, and the movable member 52 is moved to the left viewing the drawing by that the retainer 56 is pressed by the nozzle operating cylinder 107A. On the receipt of force of the valve spring 55, the valve member 54 seated on the valve seat 53 moves a predetermined distance, together with the movable member 52. However, a further movement of the valve member 54 is restricted by that an axis portion 54a of the valve member 54 abuts a projecting portion 51P of the casing 51. Therefore, with a further movement of the movable member 52, the valve member 54 is finally removed from the valve seat 53, and the check valve apparatus 119' is opened. In this state, the vacuum pumping of the inside of the carrier plate via the exhaust passage 118 is performed.

On the other hand, the operation of releasing the vacuum of the carrier plate is performed in the same method as described above. The atmosphere is introduced from the exterior by opening the check valve apparatus 119', so that the inside of the plate is opened to the atmosphere.

As previously described, according to the plastic card of the present invention, it is capable of eliminating printing distortion, character blur and the like, thereby improving the appearance quality.

According to the plastic card manufacturing method of the present invention, the card component sheets can be layered at high collation accuracy without causing distortion and twisting. It is therefore capable of manufacturing the plastic cards excellent in the appearance quality that are free from printing distortion, character blue and the like.

According to the plate for heat press of the present invention, it is capable of integrating the respective card component sheets without substantially causing distortion and twisting of the card component sheets. It is also capable of transferring in a state of being separated from the degassing unit.

According to the card manufacturing apparatus of the present invention, in addition to the above-mentioned effects, the supply section, the secondary section and the extraction section can be arranged arbitrarily, and many types of cards can be manufactured in a single apparatus.

The invention claimed is:

1. A card comprising:
   a plurality of card component sheets having two or more reference holes in a plurality of corresponding positions in more than one sheet of said plurality of card component sheets;
   wherein a first reference hole of said reference holes has a shape substantially the same as a cross-sectional shape of a first positioning pin that passes through said first reference hole for aligning the sheets during formation of the card;
   wherein a second reference hole of said reference holes has an opening area larger than a cross-sectional area of a second positioning pin that passes through the second reference hole for aligning said sheets during formation of the card; and
   wherein the sheets are connected together so an aligned positional relationship between said sheets is secured.

2. The card as set forth in claim 1 wherein said card is an IC card in which an IC chip is embedded.

3. The card as set forth in claim 1 wherein said plurality of reference holes have various shapes.

4. The card as set forth in claim 1, further comprising a non-heat-press portion around said reference holes, wherein said sheets remain unconnected at the non-heat-press portion during formation of the card.

5. The card as set forth in claim 1 wherein the card includes a polymer.

6. The card as set forth in claim 1 wherein said plurality of reference holes are aligned adjacent a common edge of the card.

7. The card as set forth in claim 6 wherein said plurality of reference holes includes at least three reference holes.

* * * * *